US011248483B2

(12) United States Patent
Romagnoli et al.

(10) Patent No.: US 11,248,483 B2
(45) Date of Patent: Feb. 15, 2022

(54) TURBINE HOUSING AND METHOD OF IMPROVING EFFICIENCY OF A RADIAL/MIXED FLOW TURBINE

(71) Applicant: Nanyang Technological University, Singapore (SG)

(72) Inventors: Alessandro Romagnoli, Singapore (SG); Srithar Rajoo, Singapore (SG); Ricardo Fernando Martinez-Botas Mateo, Singapore (SG); Hao Liu, Singapore (SG)

(73) Assignee: Nanyang Technological University, Singapore (SG)

( * ) Notice: Subject to any disclaimer, the term of this patent is extended or adjusted under 35 U.S.C. 154(b) by 94 days.

(21) Appl. No.: 16/618,051

(22) PCT Filed: Jun. 1, 2018

(86) PCT No.: PCT/SG2018/050272
§ 371 (c)(1),
(2) Date: Nov. 27, 2019

(87) PCT Pub. No.: WO2018/222141
PCT Pub. Date: Dec. 6, 2018

(65) Prior Publication Data
US 2020/0173298 A1 Jun. 4, 2020

(30) Foreign Application Priority Data

Jun. 1, 2017 (SG) .......................... 10201704491Y
May 4, 2018 (SG) .......................... 10201803786P

(51) Int. Cl.
*F01D 11/10* (2006.01)
*F02B 37/10* (2006.01)
*F02C 6/08* (2006.01)

(52) U.S. Cl.
CPC .............. *F01D 11/10* (2013.01); *F02B 37/10* (2013.01); *F02C 6/08* (2013.01); *F05D 2220/40* (2013.01)

(58) Field of Classification Search
CPC ........ F01D 11/10; F01D 17/165; F02B 37/10; F02C 6/08
(Continued)

(56) References Cited

U.S. PATENT DOCUMENTS 10,473,114 B2 * 11/2019 Rusch ..................... F04D 17/10
2007/0266705 A1 11/2007 Wood et al.
(Continued)

FOREIGN PATENT DOCUMENTS

| JP | 2008202415 A | * | 9/2008 | ......... F04D 29/4213 |
| JP | 2008248763 A | * | 10/2008 | ......... F04D 29/4213 |

(Continued)

OTHER PUBLICATIONS

Foreign Communication from a Related Counterpart Application, International Search Report and Written Opinion dated Sep. 4, 2018, International Application No. PCT/SG2018/050272 filed on Jun. 1, 2018.

(Continued)

*Primary Examiner* — J. Todd Newton

(57) ABSTRACT

A turbine housing for a radial/mixed flow turbine, the turbine having a rotor comprising a plurality of blades disposed about a hub, the turbine housing comprising: a shroud configured to at least partially enshroud the rotor wherein a clearance is provided between the shroud and blade tips of the plurality of blades, the shroud and the hub defining a main passage of fluid flow in the turbine; and at least one injection opening provided in the shroud, the at least one injection opening configured to allow injection of
(Continued)

a secondary flow of fluid into at least the clearance between the shroud and the blade tips.

16 Claims, 24 Drawing Sheets

(58) Field of Classification Search
USPC ............................................................ 415/1
See application file for complete search history.

(56) References Cited

U.S. PATENT DOCUMENTS

| | | | |
|---|---|---|---|
| 2011/0085892 A1 | 4/2011 | John et al. | |
| 2013/0266436 A1* | 10/2013 | Ibaraki | F01D 25/24 415/208.1 |
| 2014/0093354 A1* | 4/2014 | Sekularac | F04D 27/0238 415/58.4 |
| 2015/0369073 A1* | 12/2015 | Japikse | F01D 9/06 415/115 |
| 2017/0206522 A1 | 7/2017 | Schiatti et al. | |
| 2017/0232300 A1 | 8/2017 | Tran et al. | |

FOREIGN PATENT DOCUMENTS

| | | | | |
|---|---|---|---|---|
| JP | 2013015034 A | * | 1/2013 | ......... F04D 29/4213 |
| JP | 2013015034 A | | 1/2013 | |
| JP | 5470285 B2 | | 4/2014 | |
| WO | 2018222141 A1 | | 6/2018 | |

OTHER PUBLICATIONS

Behr, T., Kalfas, A. I. & Abhari, R. S. 2008. Control of rotor tip leakage through cooling injection from the casing in a high-work turbine. Journal of Turbomachinery, 130, 031014.
Benton, S. I., Bons, J. P. & Sondergaard, R. 2013. Secondary Flow Loss Reduction Through Blowing for a High-Lift Front-Loaded Low Pressure Turbine Cascade. Journal of Turbomachinery, 135, 021020.
Bloxham, M. J. & Bons, J. P. 2010. Leading-Edge Endwall Suction and Midspan Blowing to Reduce Turbomachinery Losses. Journal of Propulsion and Power, 26, 1268-1275.
Denton, J. D. 1993. The 1993 igti scholar lecture: Loss mechanisms in turbomachines. Journal of Turbomachinery, 115, 621-656.
Gao, J., Zheng, Q., Dong, P. & Zha, X. 2014. Control of Tip Leakage Vortex Breakdown by Tip Injection in Jnshrouded Turbines. Journal of Propulsion and Power, 30, 1510-1519.
Herwig, H. & Kock., F. 2007. Direct and indirect methods of calculating entropy generation rates in turbulent convective heat transfer problems. Heat and mass transfer 43, 207-215.
Kirtley, K. R., Beach, T. A. & Rogo, C. 1993. Aeroloads and secondary flows in a transonic mixed-flow turbine stage. Journal of turbomachinery, 115, 590-600.
Liu, H., Romagnoli, A., Martinez-Botas, R., Rajoo, S. & Padzillah, M. H. Multi-Injection Turbine Housing A Novel Concept for Tip-Leakage Improvement in Radial Turbines. ASME Turbo Expo 2017: Turbomachinery Technical Conference and Exposition, 2017 Charlotte, NC, USA. American Society of Mechanical Engineers, V02CT44A022-V02CT44A022.
Lüddecke, B., Filsinger, D. & Ehrhard, J. 2012. On Mixed Flow Turbines for Automotive Turbocharger Applications. International Journal of rotating machinery.
Newton, P., Palenschat, T., Martinez-Botas, R. & Seiler, M. Entropy generation rate in a mixed flow turbine passage. International Gas Turbine Congress 2015, 2015 Tokyo, Japan.
Niu, M. & Zang, S. 2011. Experimental and numerical investigations of tip injection on tip clearance flow in an axial turbine cascade. Experimental Thermal and Fluid Science 35, 1214-1222.
Padzillah, M. H., Rajoo, S. & Martinez-Botas, R. F. 2014. Influence of speed and frequency towards the automotive turbocharger turbine performance under pulsating flow conditions. Energy Conversion and Management, 80.
Palfreyman, D. & Martinez-Botas., R. F. Numerical study of the internal flow field characteristics in mixed flow turbines. Proceedings of the ASME Turbo Expo, Jun. 3-6, 2002 Amsterdam.
Praisner, T. J., Grover, E. A., Knezevici, D. C., Popovic, I., Sjolander, S. A., Clark, J. P. & Sondergaard, R. 2013. Toward the Expansion of Low-Pressure-Turbine Airfoil Design Space. Journal of Turbomachinery, 135, 061007.
Rosic, B. & Denton, J. D. 2008. Conlrol of shroud leakage loss by reducing circumferential mixing. Journal of Turbomachinery, 130, 021010.
Schabowski, Z. & Hodson, H. 2014. The reduction of over tip leakage loss in unshrouded axial turbines using winglets and squealers. Journal of Turbomachinery, 136, 041001.
Whitfield, A. & Baines, N. C. 1990. Design of Radial Turbomachines, Longman Scientific & Technical.
Yamamoto, A. 1989. Endwall flow/loss mechanisms in a linear turbine cascade with blade tip clearance. Journal of Turbomachinery, 111, 264-275.
Foreign Communication from a Related Counterpart Application, Extended European Search Report dated Dec. 10, 2019, European Application No. 17934660 filed on Dec. 12, 2017.

* cited by examiner

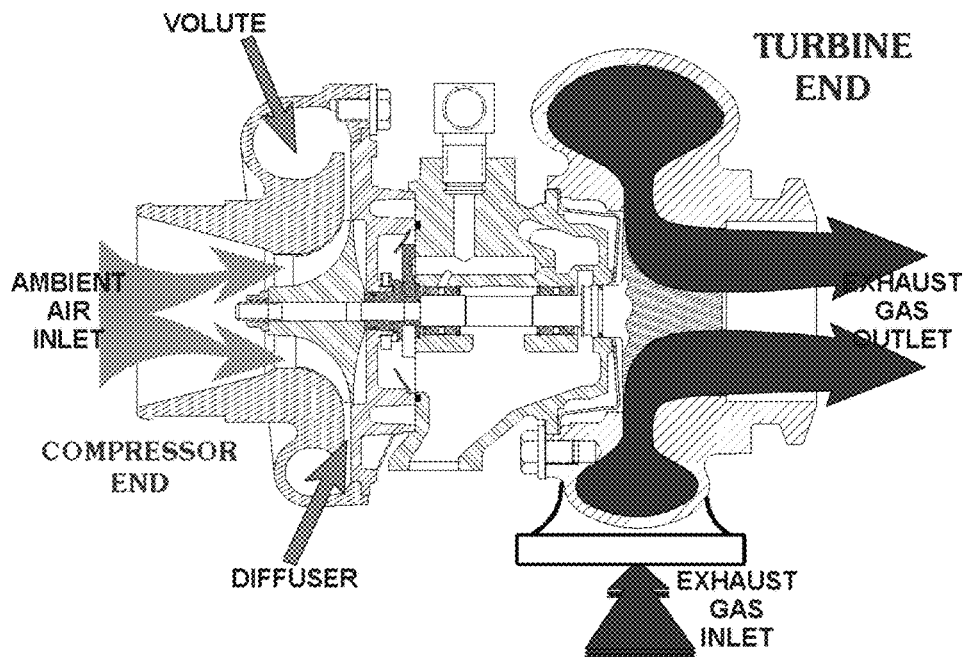
FIG. 1 (background)
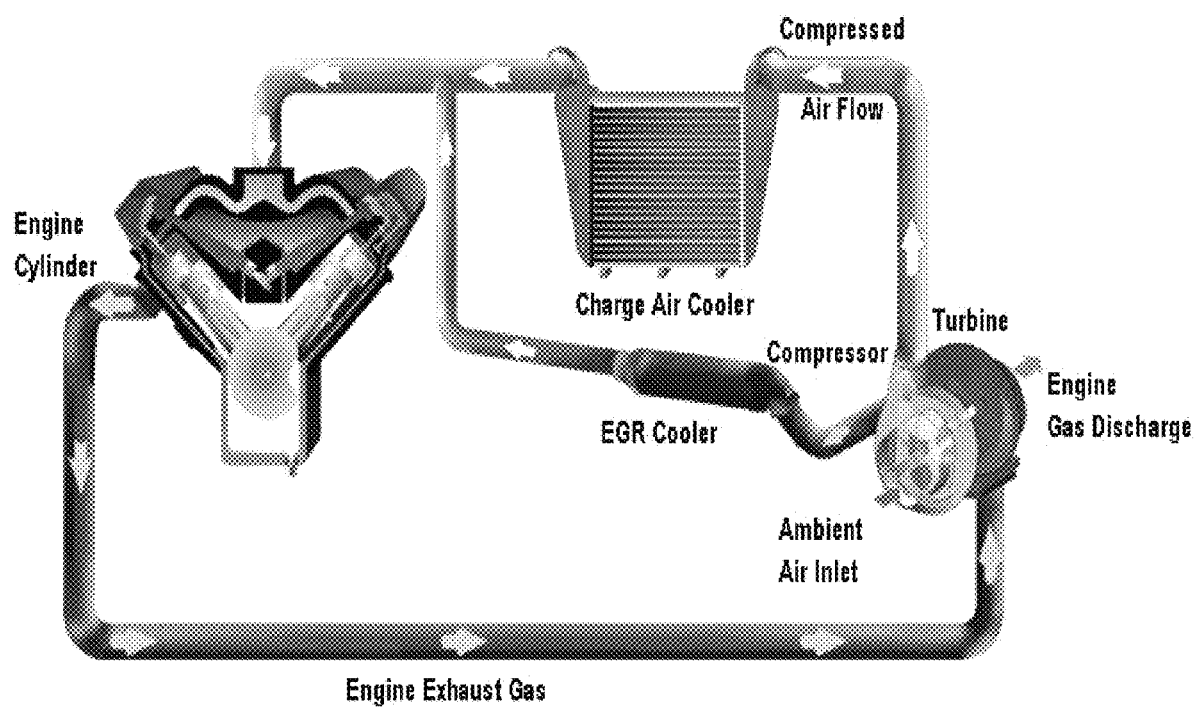
FIG. 2 (background)

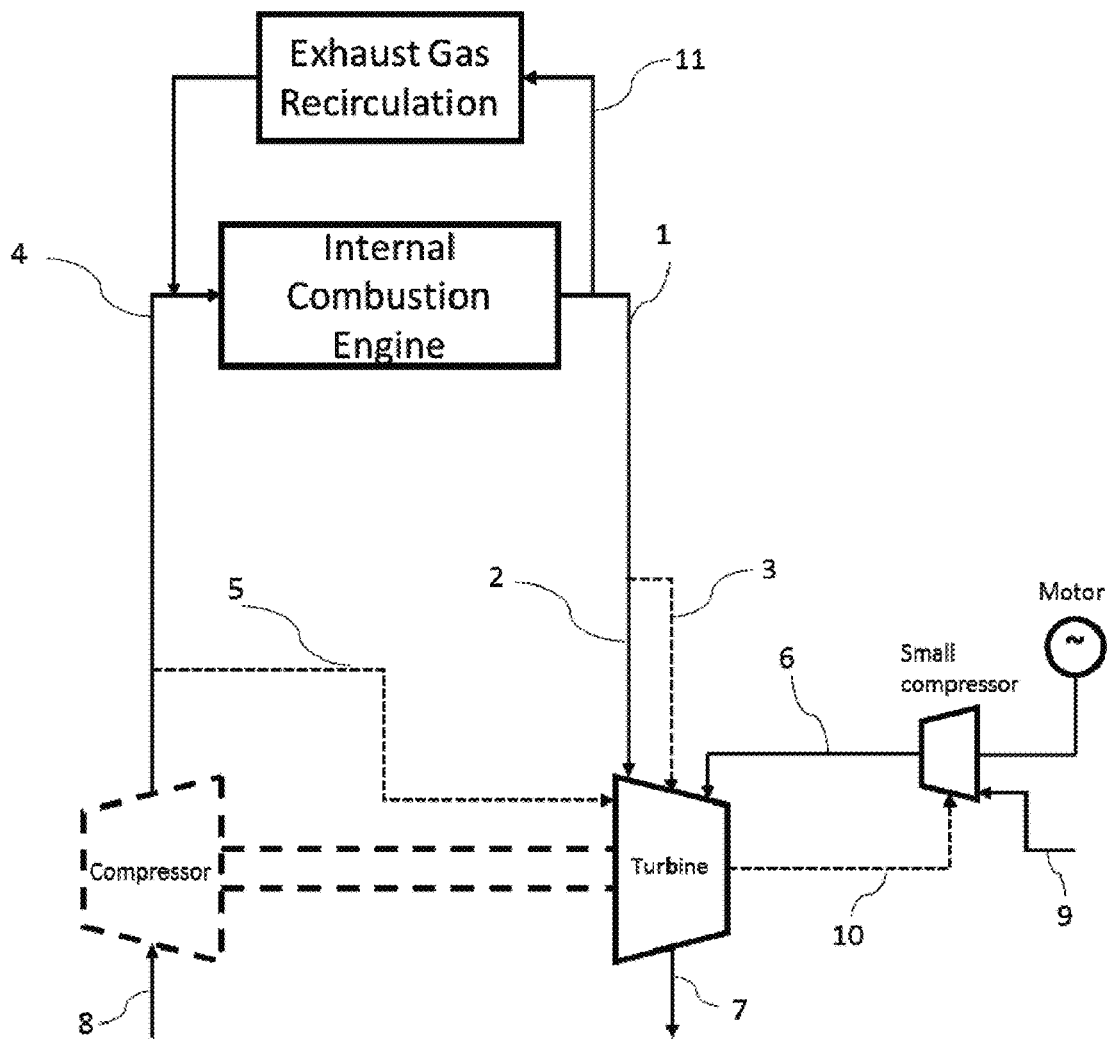

- 1) Exhaust gas out of engine
- 2) Exhaust gas into main passage of turbine
- 4) Compressed air leaving compressor
- 7) Exhaust gas leaving turbine
- 8) Inlet air to compressor
- 9) Inlet air to small compressor
- 11) Exhaust gas recirculation back into internal combustion engine

- Possible sources of injection:
    o 3) Exhaust gas into injection (e.g. wastegate)
    o 5) Bleed air from compressor into injection
    o 6) External source of air into injection
    o 10) Exhaust gas into small compressor (into injection)

FIG. 17

TURBINE HOUSING AND METHOD OF IMPROVING EFFICIENCY OF A RADIAL/MIXED FLOW TURBINE

CROSS-REFERENCE TO RELATED APPLICATIONS

The present application is a filing under 35 U.S.C. 371 as the National Stage of International Application No. PCT/SG2018/050272, filed Jun. 1, 2018, entitled "TURBINE HOUSING AND METHOD OF IMPROVING EFFICIENCY OF A RADIAL/MIXED FLOW TURBINE," which claims priority to Singapore Application No. SG 10201803786P filed with the Intellectual Property Office of Singapore on May 4, 2018 and Singapore Application No. SG 10201704491Y filed with the Intellectual Property Office of Singapore on Jun. 1, 2017, all of which are incorporated herein by reference in their entirety for all purposes.

FIELD OF INVENTION

This invention relates to a turbine housing and method of improving efficiency of a radial/mixed flow turbine.

BACKGROUND

Fuel in an internal combustion engine requires a finite mass of air in order to achieve and sustain combustion which uses oxygen in the air. The relation between the amount of fuel and air in an engine is called the air-to-fuel ratio. In an internal combustion engine, the air-to-fuel ratio is fixed and it is a design parameter of the engine itself. In addition to this, engine power is directly proportional to the amount of fuel being burnt. By delivering more air into an engine using a turbocharger, which is one of many applications of a radial/mixed flow turbine, more fuel can be burned. This enables a turbocharged engine to produce more power and torque compared to an equivalent naturally aspirated engine.

A typical turbocharger as shown in FIG. 1 comprises a single-stage radial-flow ("centrifugal") compressor driven by a single-stage radial-flow turbine, the turbine and compressor being connected together via a shaft. The turbine and compressor each comprise a wheel housed in a flow collector or housing which serves the purpose of both accelerating and providing guidance to fluid flow. Exhaust gas leaving the engine is accelerated in the turbine housing before passing through the turbine wheel. Energy from flow of the exhaust gas is thus transferred to the turbine wheel which starts spinning. As a consequence of the turbine wheel rotation, the compressor wheel will also rotate at the same speed as it is on the same shaft as the turbine wheel. As the compressor wheel rotates, ambient fresh air is drawn inside the housing of the compressor which compresses the air to a higher pressure. The compressed air leaving the compressor wheel is then squeezed into the engine. In this way, the turbine extracts energy from flow of engine exhaust gas in the turbine and converts it into useful work to power the compressor that increases the density of charged-air delivered to the engine cylinders, as shown in FIG. 2. The energy recovery aspect of turbochargers is thus given by the energy transfer occurring between the exhaust gas and the turbine wheel while the boosting aspect is given by the compressor wheel forcing more air into the engine.

Since turbochargers can increase engine power, for a given application to achieve the same power output, the engine could be made smaller when coupled with a turbocharger, and in the process reduce fuel consumption and emission. Turbochargers are thus desirable for recovering as much energy as possible from the exhaust gas and obtaining better fuel consumption for the engine.

The energy that a turbine is able to produce depends on its inlet and outlet conditions. The inlet conditions are dependent on the engine exhaust. Meanwhile the outlet conditions are set by the downstream components or by the atmosphere if it is exhausted directly. The measure of energy availability and corresponding actual energy recovered by a conventional turbine is given by equation [1] below:

$$\dot{W}_T = \left\{ \dot{m}_{inlet} C_p T_{0inlet} \left[ 1 - \left( \frac{P_{exit}}{P_{0inlet}} \right)^{\frac{\gamma-1}{\gamma}} \right] \right\} \eta_T \quad \text{Eq. [1]}$$

$\dot{m}_{inlet}$ : Turbine Inlet Mass flow rate $C_p$ : Heat Capacity constant Pressure $T_{0inlet}$ : Turbine Inlet Temperature $\frac{P_{exit}}{P_{0inlet}} \approx \frac{P_{Ambient}}{P_{Back}}$ : Pressure Ratio $\gamma$ : Heat Capacity Ratio $\eta_T$ : Turbine Efficiency In a system with secondary injection flow inlets, it is important to take into account the energy available from secondary flow. In that case, Eq. [1] is modified as follows:

$$\dot{W}_T = \left\{ \dot{m}_{inlet} C_p T_{0inlet} \left[ 1 - \left( \frac{P_{exit}}{P_{0inlet}} \right)^{\frac{\gamma-1}{\gamma}} \right] + \sum_{i=1}^{n} \dot{m}_{inj,i} C_p T_{0inj,i} \left[ 1 - \left( \frac{P_{exit}}{P_{0inj,i}} \right)^{\frac{\gamma-1}{\gamma}} \right] \right\} \eta_T \quad \text{Eq. [2]}$$

$\dot{m}_{inj,i}$ : Injection Mass Flow Rate $T_{0inj,i}$ : Injection Inlet Temperature $P_{0inj,i}$ : Injection Inlet Total Pressure The term in Eq. [1] and Eq. [2] which is of interest is the turbine efficiency, $\eta_T$, governed by all the losses in the machine. These losses are partly in the turbine housing and the rest are in the impeller or turbine wheel itself. The housing is designed to provide adequate flow features so that some of the turbine wheel losses can be reduced. However not all losses can be addressed with conventional housing design, and one of it is the tip leakage loss in the turbine. FIG. 3 shows a meridional view of a turbine wheel in which the flow direction can be seen. The turbine housing encapsulates the turbine wheel and other rotating components, providing shield as well as flow guidance. Rotation of the turbine wheel requires a level of clearance from the housing in the form of a radial gap between the blade tips of the rotor and a shroud of the housing, which can be seen in FIG. 3. Due to the clearance, some of the high pressure flow will escape into the clearance, without imparting momentum onto the wheel, thus being a source of energy loss in the turbine. The tip clearance leakage, apart from not imparting momentum, also mixes with the main flow downstream and creates vortices as shown in FIGS. 4a and 4b, which further increases losses in the turbine wheel.

Another source of loss can arise from flow separations within the turbine wheel. This can come from an unfavourable incidence angle, which leads to flow separation over the turbine wheel blade, which can then roll up into a vortex and increase losses in the turbine wheel. This is illustrated in FIG. 4c, where a separation on the suction surface of the turbine wheel rolls up into a vortex.

As radial/mixed flow turbines have wide ranging applications besides use in turbochargers for internal combustion engines, it is thus desirable to devise a radial/mixed flow turbine with reduced or minimized loss that may be appropriately configured for various uses as well as a method of improving efficiency of radial/mixed flow turbines.

SUMMARY OF INVENTION

The present application discloses a turbine housing for a radial/mixed flow turbine that uses flow injection to mitigate energy losses due to tip leakage, flow separation and the consequent vortices, and a corresponding method of improving efficiency of a radial/mixed flow turbine. While suitable for use in a turbocharger, the turbine housing is not confined to turbocharging applications and may be appropriately configured for all radial/mixed flow turbines to reduce losses in the turbine.

According to a first aspect, there is provided a turbine housing for a radial/mixed flow turbine, the turbine having a rotor comprising a plurality of blades disposed about a hub, the turbine housing comprising: a shroud configured to at least partially enshroud the rotor wherein a clearance is provided between the shroud and blade tips of the plurality of blades, the shroud and the hub defining a main passage of fluid flow in the turbine; and at least one injection opening provided in the shroud, the at least one injection opening configured to allow injection of a secondary flow of fluid into at least the clearance between the shroud and the blade tips.

The at least one injection opening may comprise a plurality of holes provided in the shroud.

Alternatively, the at least one injection opening may comprise at least one injection slot extending circumferentially around at least part of the shroud.

At least one exit opening may be provided in the shroud, the at least one exit opening being displaced from and downstream of the at least one injection opening, and wherein an inner wall of the shroud between the at least one injection opening and the at least one exit opening is recessed to provide an increased clearance between the shroud and the blade tips in between the at least one injection opening and the at least one exit opening.

The at least one injection opening may be configured to allow injection of the secondary flow of fluid into only the increased clearance between the shroud and the blade tips, and wherein the at least one exit opening is configured to allow exit of the secondary flow of fluid from the increased clearance out of the shroud.

The at least one injection opening may be further configured to allow injection of the secondary flow of fluid into the main passage of fluid flow.

According to a second aspect, there is provided a method of improving efficiency of a radial/mixed flow turbine, the turbine having a rotor comprising a plurality of blades disposed about a hub, the turbine housing comprising a shroud configured to at least partially enshroud the rotor wherein a clearance is provided between the shroud and blade tips of the plurality of blades, the shroud and the hub defining a main passage of fluid flow in the turbine, the method comprising the step of:

(a) injecting a secondary flow of fluid into the clearance between the shroud and the blade tips through at least one injection opening provided in the shroud.

Step (a) may comprise injecting the secondary flow of fluid at a yaw angle relative to a rotational axis of the rotor, the yaw angle being on a θ-z plane at the at least one injection opening.

The yaw angle may be in a same direction from the rotational axis as a direction of rotation of the rotor.

The method may further comprise the step of:

(b) exiting the secondary flow of fluid from the clearance out of the shroud through at least one exit opening provided in the shroud, the at least one exit opening being displaced from and downstream of the at least one injection opening, wherein the clearance is an increased clearance by an inner wall of the shroud being recessed between the at least one injection opening and the at least one exit opening.

Alternatively, the method may further comprise the step of:

(c) injecting the secondary flow of fluid into the main passage of fluid flow.

Step (c) may comprise injecting the secondary flow of fluid at a pitch angle relative to a rotational axis of the rotor, the pitch angle being a radial angle made between the injected secondary flow of fluid and a horizontal plane.

For all aspects, the radial/mixed flow turbine may be comprised in a turbocharger and wherein the secondary flow of fluid comprises high pressure exhaust gas obtained from an internal combustion engine into which high density air from the turbocharger is fed.

Step (a) may comprise injecting the secondary flow of fluid in pulses.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIG. 1 (background) is a schematic cross-sectional illustration of a radial/mixed flow turbocharger comprising a turbine and a compressor connected via single shaft.

FIG. 2 (background) is a schematic illustration of an engine turbocharging system.

FIG. 17 is a schematic illustration of an exemplary injection system design of an internal combustion engine coupled to a turbocharger comprising the turbine housing of the present invention.

DETAILED DESCRIPTION

Figure 3:
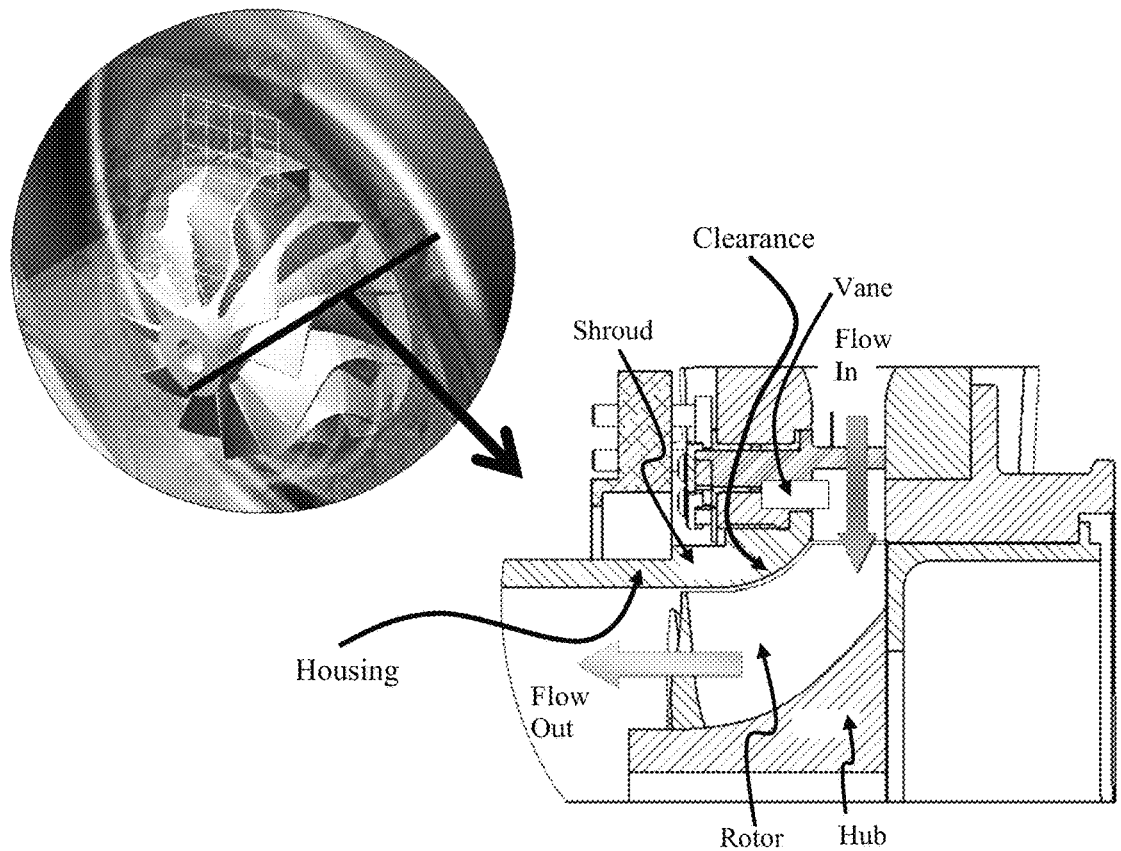
FIG. 3 (prior art) is a schematic meridional view of a radial/mixed flow turbine.
Figure 4A:
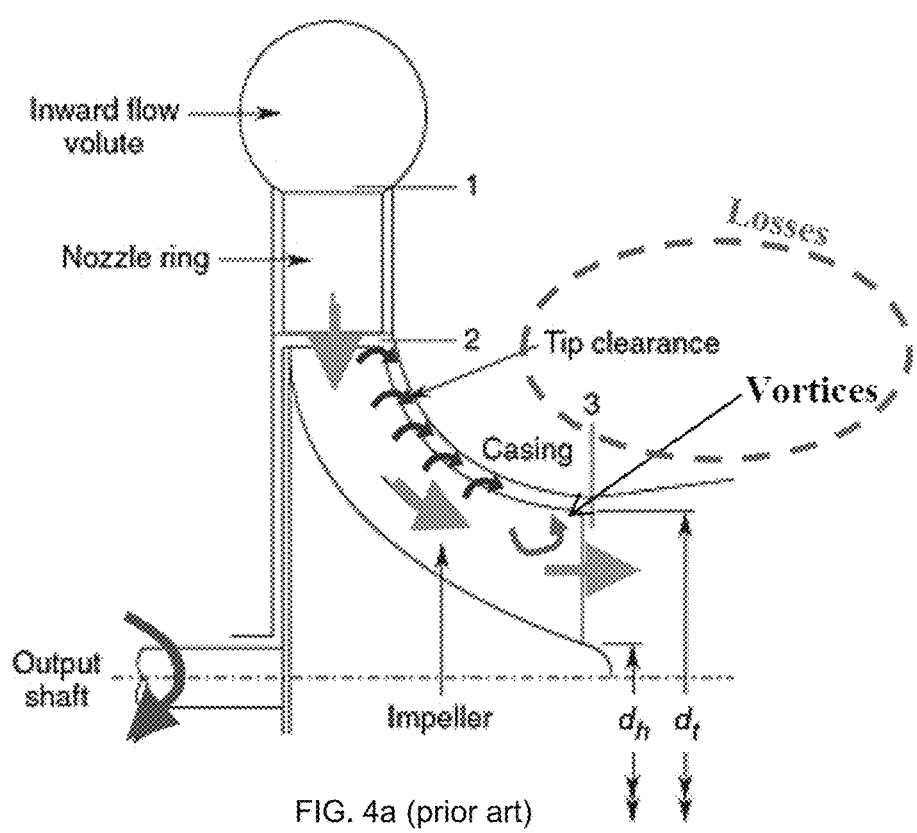
FIG. 4a (prior art) is a schematic meridional view of a radial/mixed flow turbine showing clearance leakage and vortices FIG. 4b (prior art) is a schematic meridional view of a radial/mixed flow turbine showing clearance vortices FIG. 4c (prior art) is a schematic perspective view of a radial/mixed flow turbine showing a separation vortex
Figure 4B:
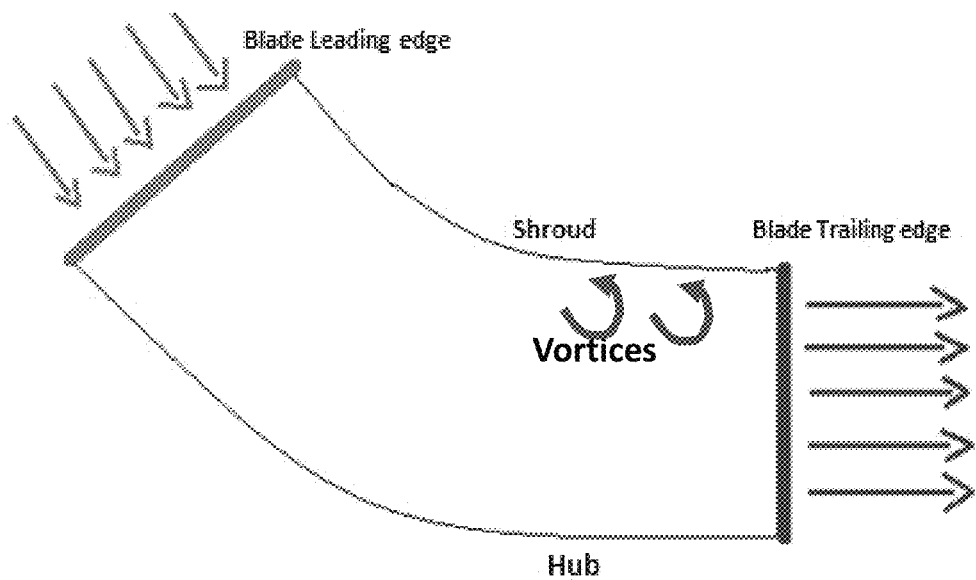
Figure 4C:
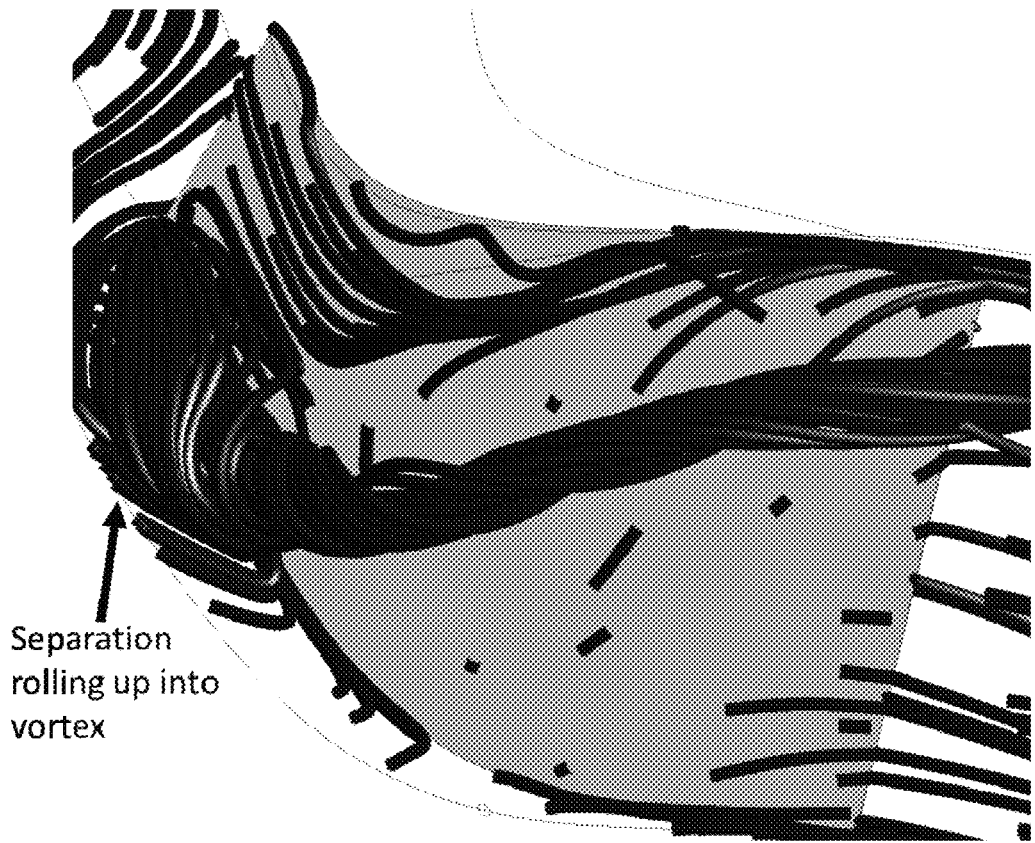
Figure 5:
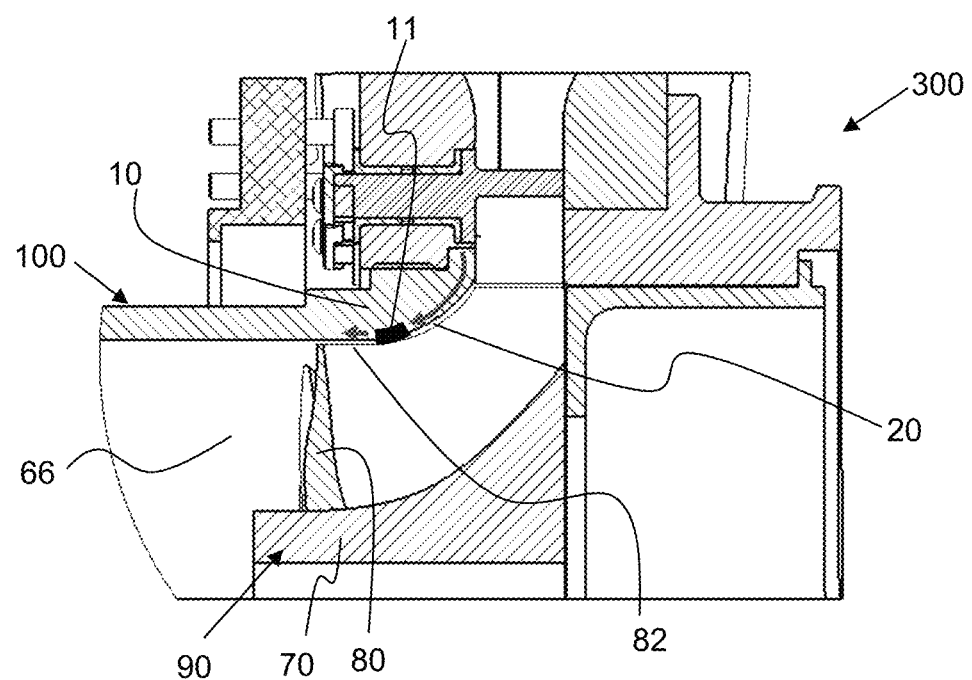
FIG. 5 is a schematic meridional view of a radial/mixed flow turbine showing a first exemplary embodiment of a turbine housing.

Exemplary embodiments of a turbine housing 100 and method 200 of improving efficiency of a radial/mixed flow turbine 300 will be described below with reference to FIGS. 5 to 33 in which the same reference numerals are used to denote the same or similar parts.

As shown in FIGS. 5 to 14, in general, the turbine housing 100 comprises a shroud 10 configured to at least partially enshroud a rotor 90 of a radial/mixed flow turbine 300. The rotor 90 comprises a plurality of blades 80 disposed about a hub 70 and rotates about a rotational axis R of the turbine 300. A clearance 20 is provided between the shroud 10 and blade tips 82 of the plurality of blades 80. The shroud 10 and the hub 70 define a main passage 66 of fluid flow in the turbine 300 in which a main flow 60 of fluid passes. At least one injection opening 11 is provided in the shroud 10. The at least one injection opening 11 is configured to allow injection of a secondary flow 50 of fluid into at least the clearance 20 between the shroud 10 and the blade tips 82, in order to condition blade tip flow and improve efficiency of the turbine 300. By injection of the secondary flow into the clearance 20, the housing 100 uses the secondary flow 50 injection to mitigate losses due to tip leakage and consequent vortices.

Figure 15:
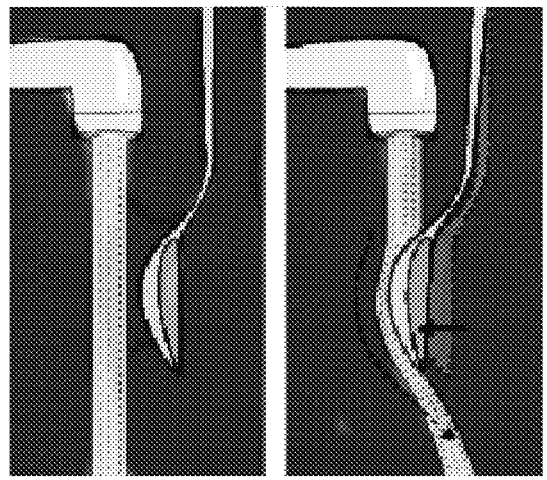
FIG. 15 is a schematic illustration of the Coanda effect.

The Coanda effect allows the injected secondary flow 50 into the clearance to be attached to the shroud 10 and allows entrainment of the main flow 60 by the injected secondary flow 50. The Coanda effect, as shown in FIG. 15, is the tendency of a fluid to follow the curvature surface of a solid, even if the surface is turned against the initial flow direction. This fluid action can be explained by force balance. As the fluid touches the surfaces, the velocity of the fluid and the friction between the fluid and wall reduces the pressure on the surface. The pressure difference between this sub-ambient condition on the surface and the ambient allows the flow to be attached and follow the surface. The entrainment of the main flow 60 by the injected secondary flow 50 pulls the main flow 60 towards the shroud 10 allowing it to follow its curvature. The high speed secondary flow 50 creates a low pressure region in the vicinity of the shroud 10 allowing the streamlines of the main flow 60 to be shifted towards the shroud 10.

Figure 16:
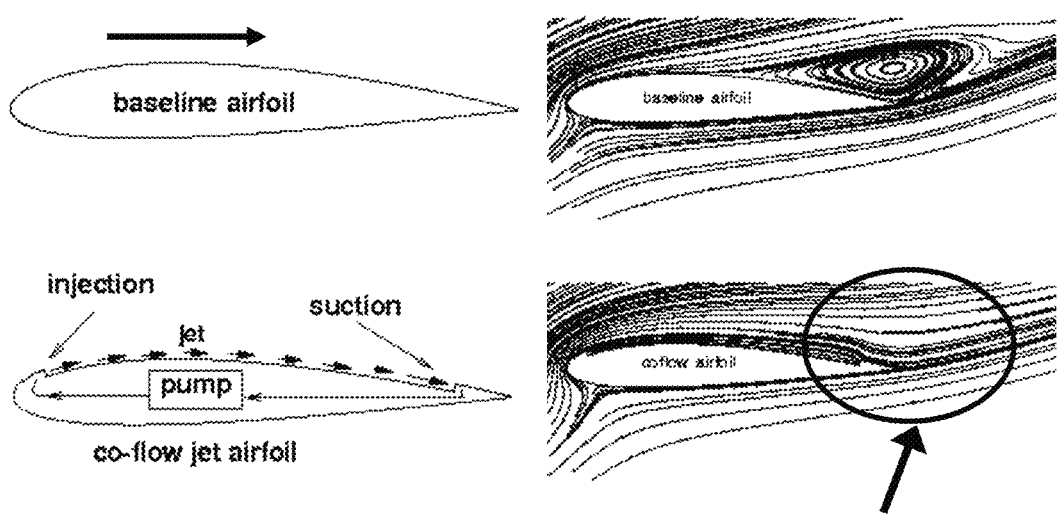
FIG. 16 is a schematic illustration of co-flow jet technology in airfoils.
Figure 18A:
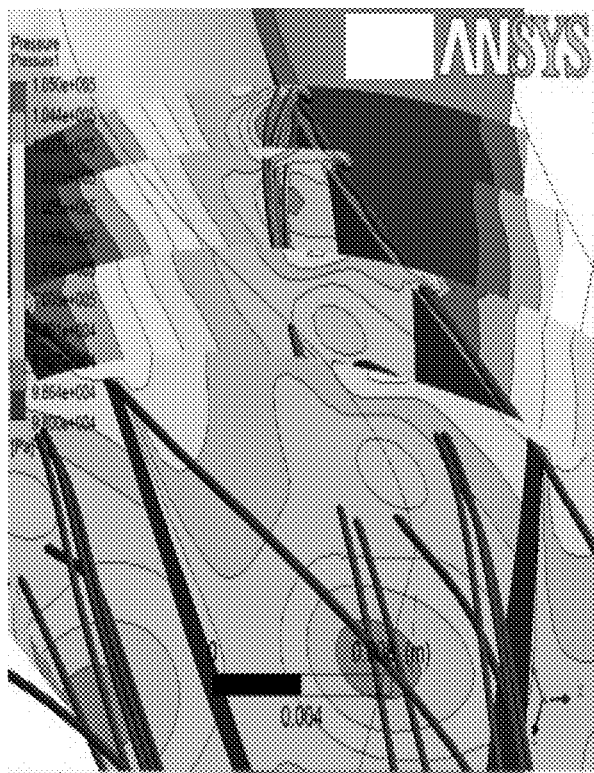
FIGS. 18A, 18B, 18C, and 18D shows CFD flow simulation of tip leakage vortex pressure contours and streamlines at different injection yaw angles.
Figure 18B:
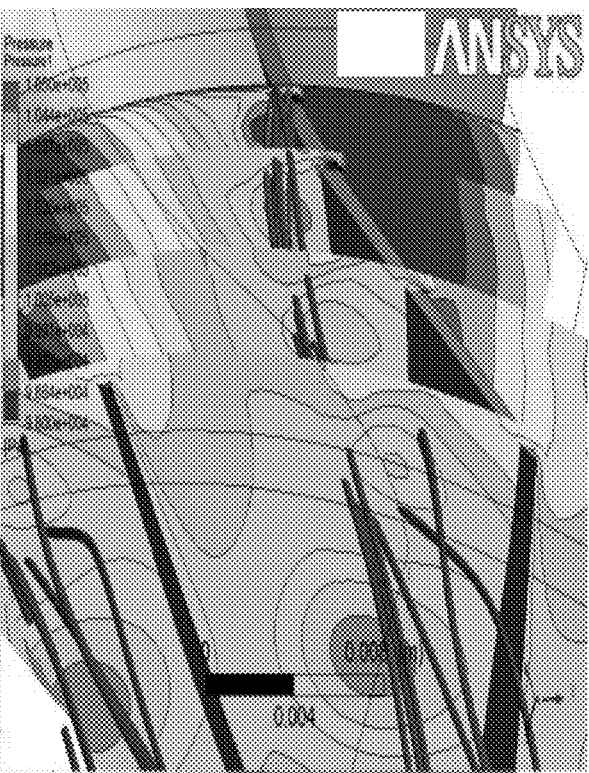
Figure 18C:
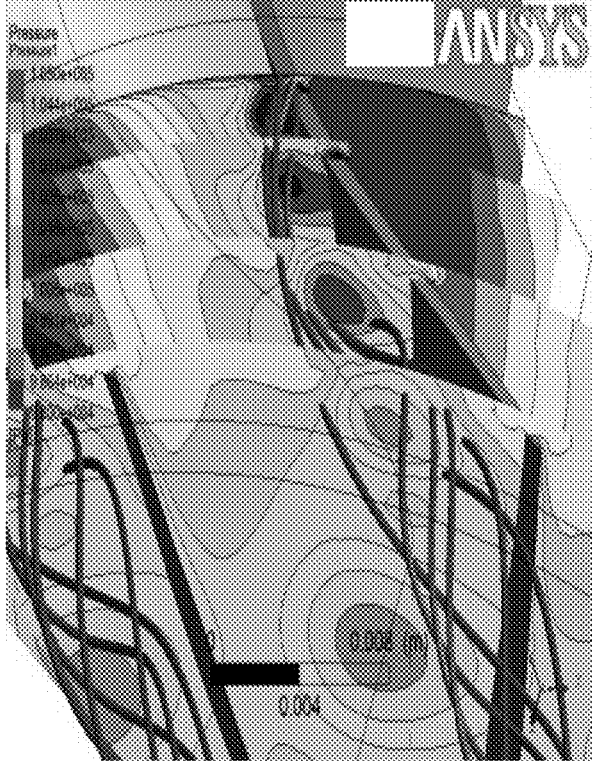
Figure 18D:
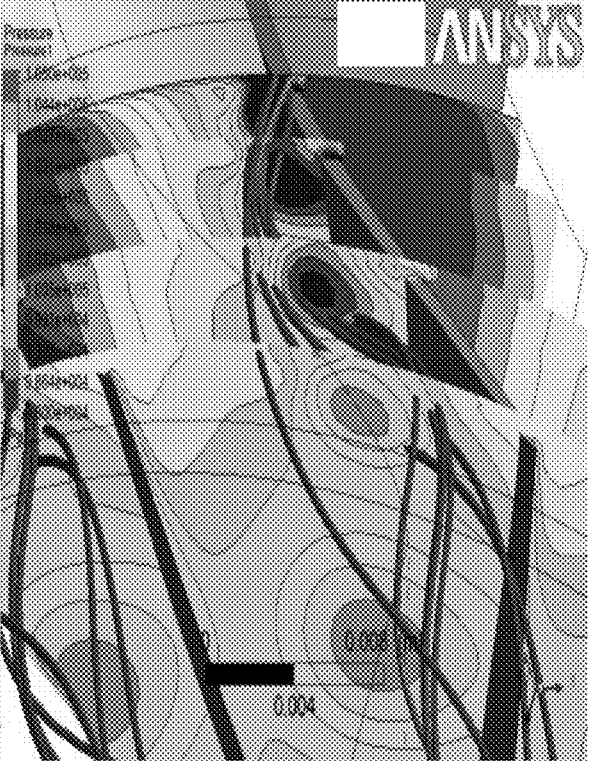
Figure 19:
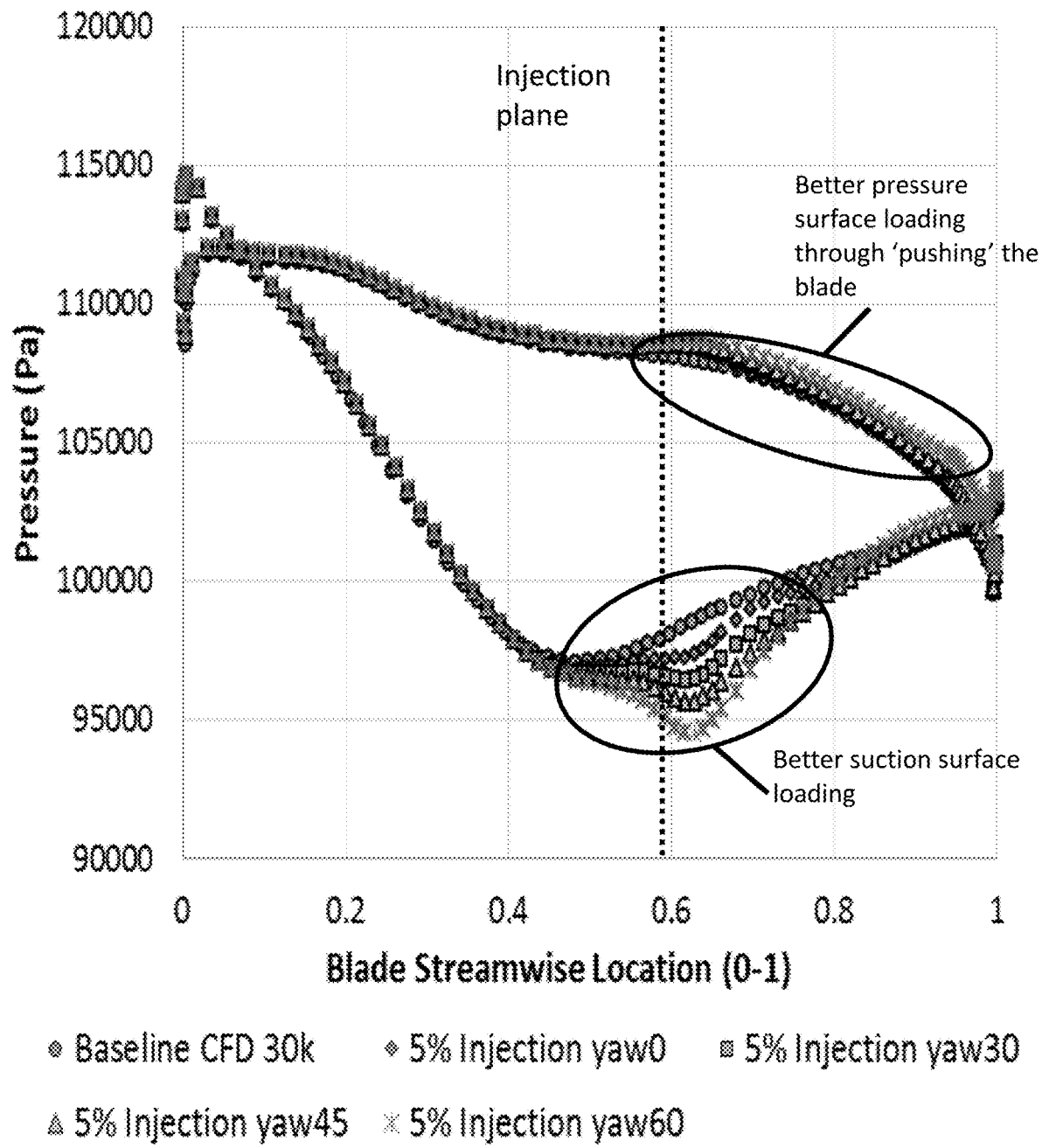
FIG. 19 is a graph of blade loading at 95% span for injection at different yaw angles compared with baseline, VR=0.7.

Co-flow jet technology is when a thin high momentum flow is injected parallel to the main flow to alter its flow characteristics, as shown in FIG. 16. The thin high momentum flow when flown over the relatively slow moving main flow imparts its momentum and transfers energy through turbulent diffusion. This is due to the density and velocity gradient that exists between the secondary or high momentum flow and the primary or main flow. The density gradient between the two co-flowing fluids causes shear force. The shear force thus gives rise to turbulent diffusion which causes the exchange of momentum. In the presently disclosed turbine housing 100, the density and velocity gradient between the secondary flow 50 and the main flow 60 generates a shear force that causes momentum exchange. This energizes the primary or main flow 60 and allows it to gain momentum. The tip leakage vortex is also energized by the additional momentum from the secondary injection 50, which causes the pressure within the vortex to decrease, leading to an increase in the low pressure region on the suction side tip, improving suction side blade loading.

Figure 6:
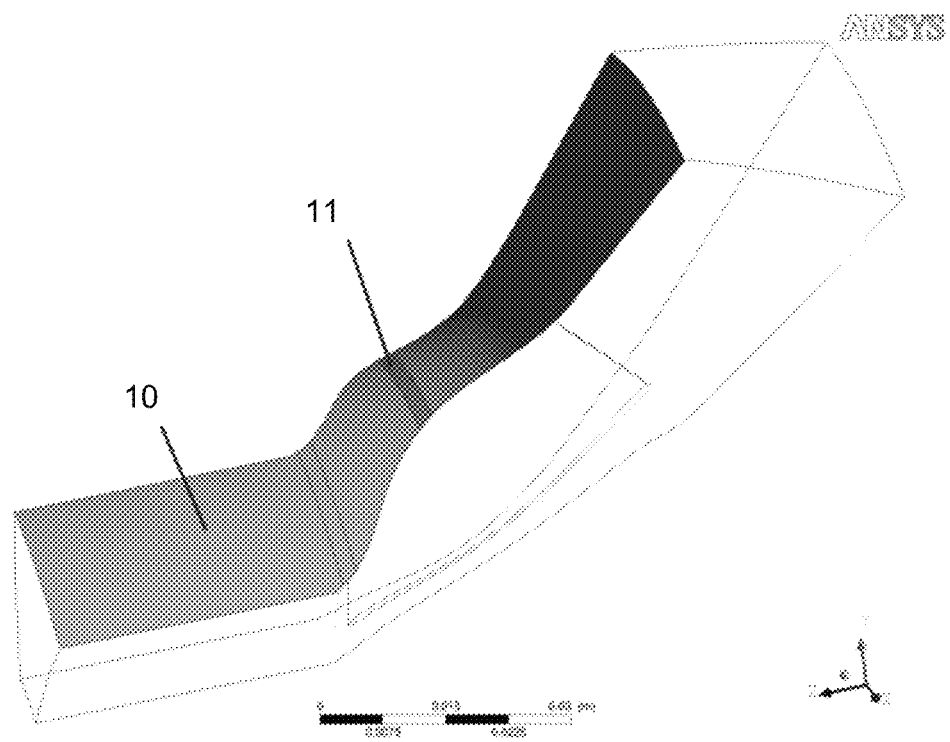
FIG. 6 is a schematic perspective view of an injection slot extending circumferentially around at least part of a shroud of the first exemplary embodiment of the turbine housing.
Figure 7:
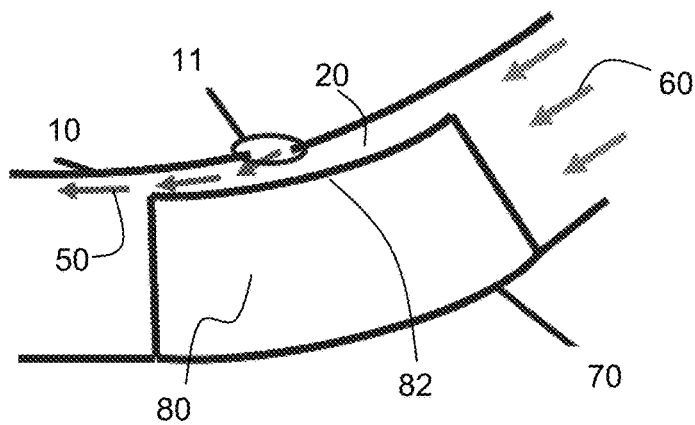
FIG. 7 is a schematic illustration of a meridional view of the injection slot, secondary flow and primary flow in the first exemplary embodiment of the turbine housing using a first exemplary method of improving efficiency of the radial/mixed flow turbine.
Figure 8:
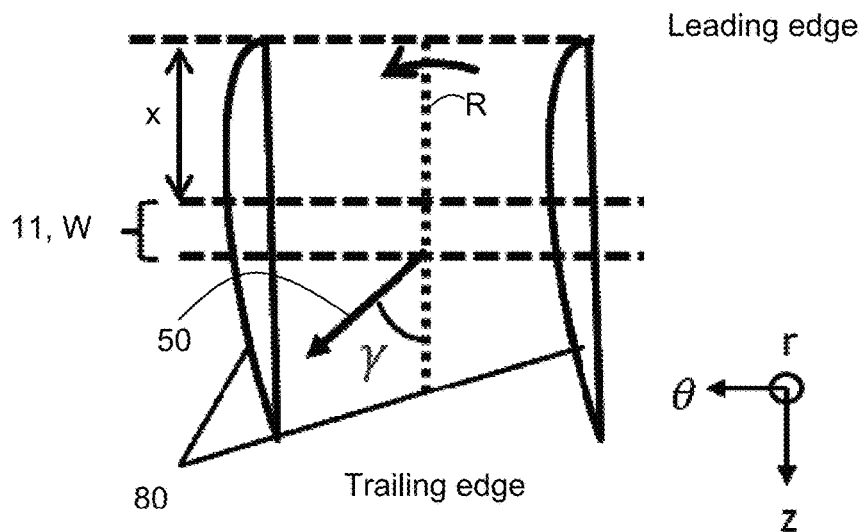
FIG. 8 is a schematic illustration of a blade-to-blade view of the injection slot and a yaw angle of injection of the first exemplary embodiment of the turbine housing.
Figure 13:
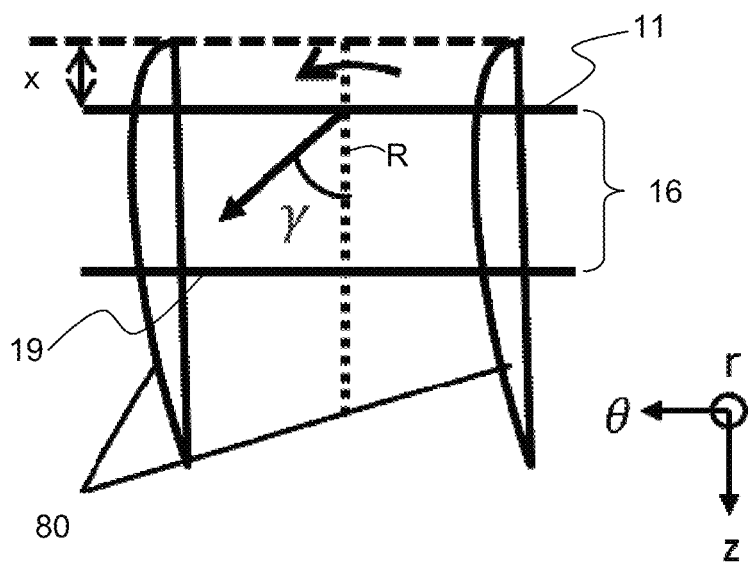
FIG. 13 is a schematic illustration of a blade-to-blade view of the increased clearance and a yaw angle of injection of the secondary exemplary embodiment of the turbine housing.
Figure 14:
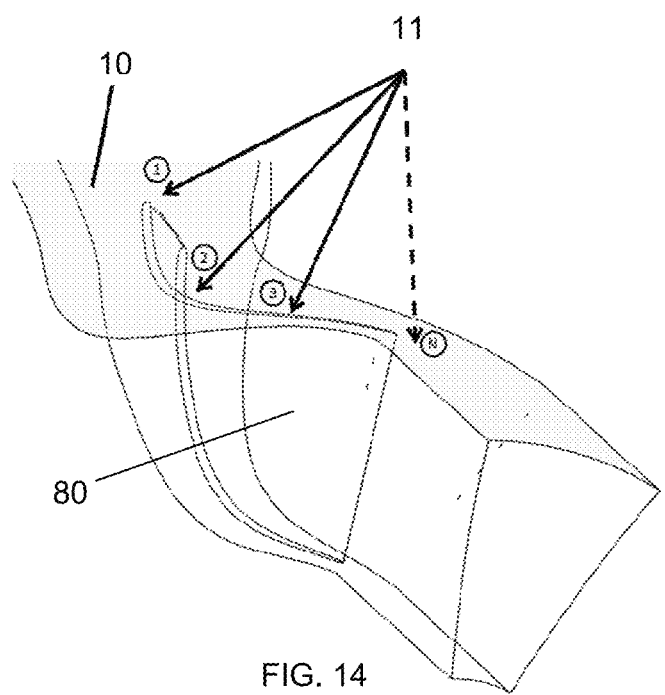
FIG. 14 is a schematic perspective illustration of possible locations of the injection opening in the shroud of exemplary embodiments of the turbine housing.

In a first exemplary embodiment of the turbine housing 100 as shown in FIGS. 5 to 10, the at least one injection opening 11 comprises a circumferential slot 11, i.e., an injection slot 11 extending circumferentially around at least part of the shroud 10, as particularly illustrated in FIG. 6. The injection opening 11 may be located on the shroud 10 at about 60% of the blade streamwise direction, but can be located anywhere on the shroud 10 along the streamwise direction, as shown in FIG. 14. Slot location of the injection slot 11 may be defined as being at an axial distance x from a leading edge of the blade tips 82 of the plurality of blades 80, as shown in FIGS. 8 and 13. The injection slot 11 itself has a slot width W that may be appropriately sized to obtain desired flow characteristics in the turbine. Preferably, the slot location is close to the leading edge since the injected secondary flow 50 can help reduce flow separation that tends to occur near the leading edge. Alternatively, for turbines that experience flow separation further downstream or elsewhere, different injection locations and types might be preferable. For example, instead of a continuous circumferential slot, the injection opening can be of discrete holes of rectangular, circular or any other shape that ensures improvement in turbine performance. Width and location of the injection slot may be finalized through optimization using a Genetic Algorithm at a single point of turbine operation, as will be described in greater detail below.

Figure 11A:
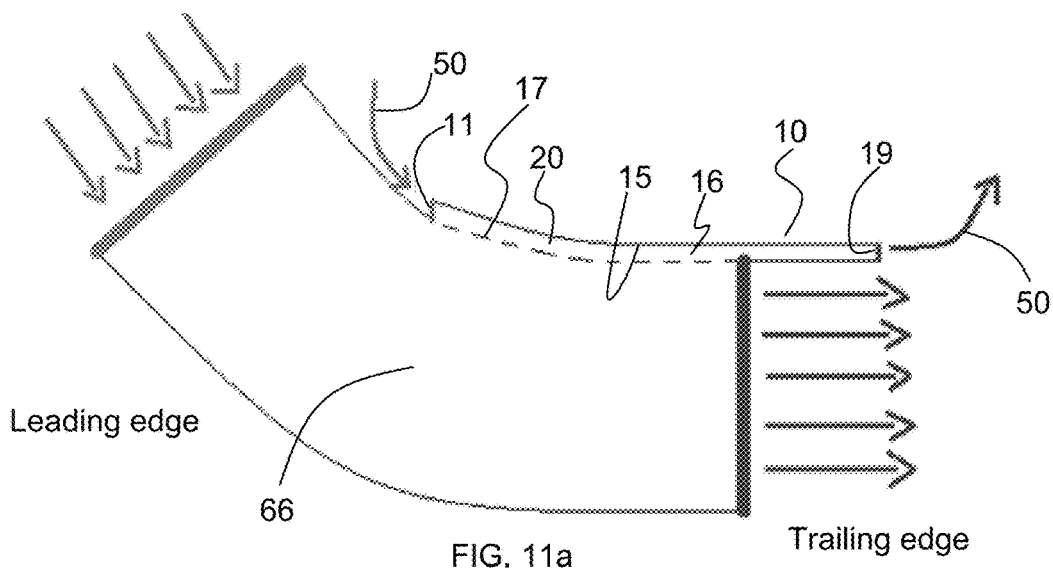
FIG. 11a is a schematic illustration of a meridional view of a second exemplary embodiment of the turbine housing showing an injection opening, an exit opening, and an increased clearance in a shroud of the turbine housing between the injection opening and the exit opening.
Figure 11B:
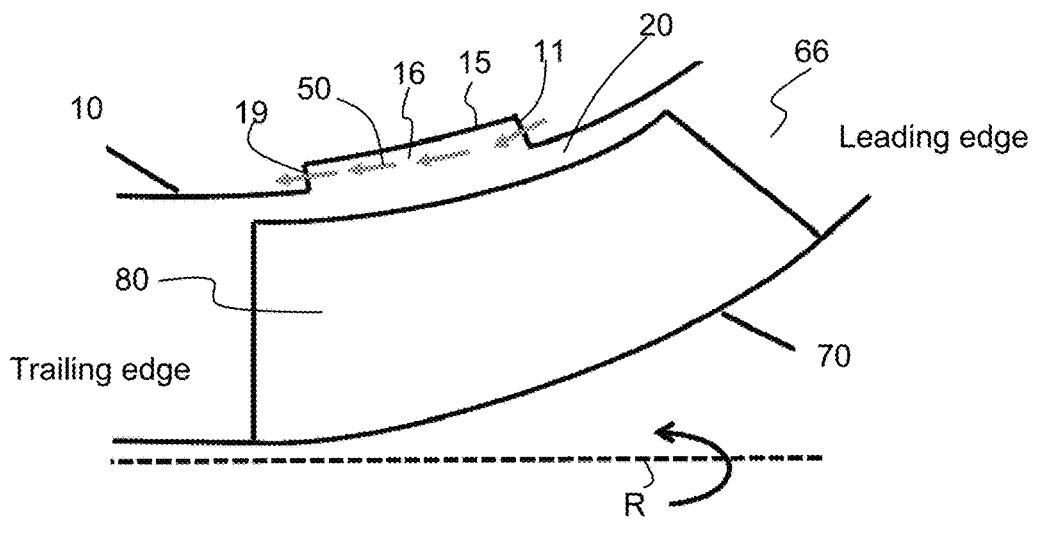
FIG. 11b is a schematic illustration of a meridional view of secondary flow in the second exemplary embodiment of the turbine housing using a first exemplary method of improving efficiency of the radial/mixed flow turbine.
Figure 12:
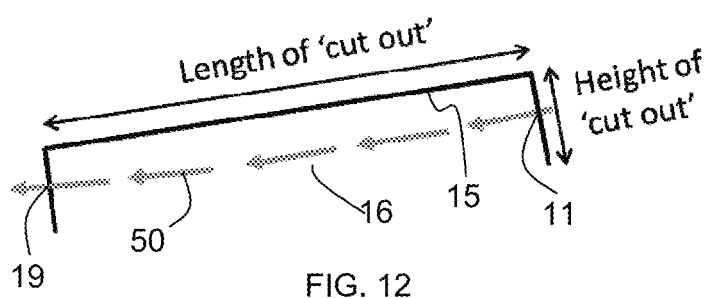
FIG. 12 is a close-up view of an increased clearance in the shroud of FIG. 11b in the form of a cut-out.

In a second exemplary embodiment of the turbine housing 100 as shown in FIGS. 11a to 13, in addition to the at least one injection opening 11, the shroud 10 is provided with at least one exit opening 19 displaced from and downstream of the at least one injection opening 11. The injection opening 11 may be located on the shroud 10 at about 60% of the blade streamwise direction, but can be located anywhere on the shroud 10 along the streamwise direction, as shown in FIG. 14. Also, instead of a continuous circumferential slot, the injection opening can be of discrete holes of rectangular, circular or any other shape that ensures improvement in turbine performance. An inner wall 15 of the shroud 10 between the at least one injection opening 11 and the at least one exit opening 19 is recessed to provide an increased clearance 20 between the shroud 10 and the blade tips 82 in between the at least one injection opening 11 and the at least one exit opening 19. This may be achieved by providing a cut-out 16 in the inner wall 15 of the shroud 10 between the at least one injection opening 11 and the at least one exit opening 19. A length of the cut-out 16 defines the displacement of the at least one exit opening 19 from the at least one injection opening 11. The at least one injection opening 11 may be provided in the shroud 10 on an upstream side wall of the cut-out 16 while the at least one suction opening 19 may be provided in the shroud 10 on a downstream side wall of the cut-out 16, as shown in FIG. 12. Where more than one exit opening 19 is provided, each exit opening 19 is provided corresponding to an injection opening 11 and a cut-out 16 in the shroud 10. Thus, in the circumferential direction, the shroud 10 may have a fully circumferential injection opening 11 or the at least one injection opening 11 may comprise a plurality of slots or the injection opening 11 may alternatively be segmented. Optionally, a mesh interface 17 may be provided between the cut-out 16 and the main passage 66, as shown in FIG. 11a. In the second exemplary embodiment of the turbine housing 100, the at least one injection opening 11 is preferably configured to allow injection of the secondary flow 50 of fluid into only the increased clearance 20 between the shroud 10 and the blade tips 82.

In a first exemplary embodiment of the method 200 to improve efficiency of the radial/mixed flow turbine 300, using either the first or second embodiments of the turbine housing 100 as described above, as shown in FIG. 33, the secondary flow 50 of fluid is injected into the clearance 20 between the shroud 10 and the blade tips 82 through the at least one injection opening 11 provided in the shroud 10 (210), as can be seen in FIGS. 7, 11a, 11b and 12. This is achieved by injecting a thin high momentum fluid through the injection slot 11 as the secondary flow 50, wherein the secondary flow 50 injected is almost parallel to the shroud casing wall so as to confine the effects of the injected secondary flow 50 to a vicinity of the blade tips 82. In this first embodiment of the method 200, the injected secondary flow 50 energizes tip leakage flow, improving blade tip loading, increasing turbine work done and increasing efficiency.

Using the first exemplary embodiment of the method 200 with the first exemplary embodiment of the turbine housing 100 described above, with reference to FIGS. 5 to 8, the injected secondary flow 50 travels mainly in the blade tip 82 region with minimal interaction with primary flow in the main passage 66. The blade tip 82 region is defined as a region adjacent the shroud 10 that is above a 90% span of the main passage 66 and includes the clearance 20 between the shroud 10 and the blade tips 82. The secondary flow 50 exits through the rotor outlet together with primary flow in the main passage 66.

Using the first exemplary embodiment of the method 200 with the second exemplary embodiment of the housing 100 described above with reference to FIGS. 11a to 13, the injected secondary flow 50 travels entirely over the blade tips 82, having minimal interaction with primary flow in the main passage 66, and escapes through the exit opening 19 of the cut-out 16.

Figure 9:
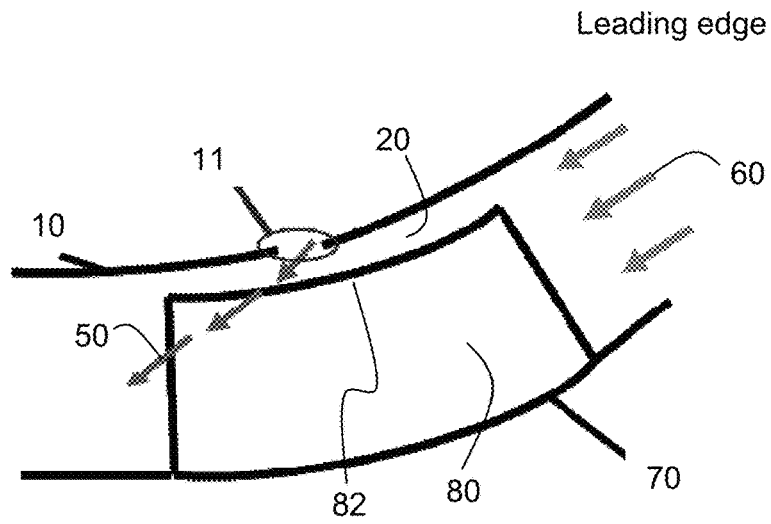
FIG. 9 is a schematic illustration of a meridional view of the injection slot, secondary flow and primary flow in the first exemplary embodiment of the turbine housing using a second exemplary method of improving efficiency of the radial/mixed flow turbine.
Figure 10:
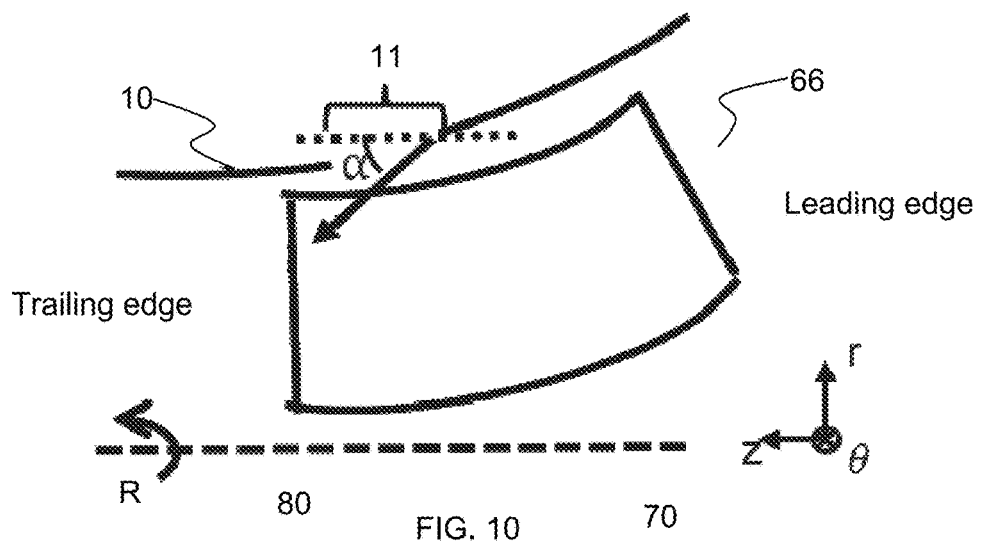
FIG. 10 is a schematic illustration of a meridional view of the injection slot and a pitch angle of injection using a second exemplary method of improving efficiency of the radial/mixed flow turbine.

In a second exemplary embodiment of the method 200 to improve efficiency of the radial/mixed flow turbine 300, using the first exemplary embodiment of the turbine housing 100 described above, the secondary flow 50 of fluid is injected into the primary flow in the main passage 66, through the at least one injection opening 11 provided in the shroud 10, as can be seen in FIG. 9. This is achieved by injecting a thin high momentum fluid through the injection slot 11 as the secondary flow 50, wherein the secondary flow 50 injected is at a pitch angle α relative to the rotational axis R of the rotor 90, the pitch angle α being on a meridional plane of the turbine 300 as shown in FIG. 10. The pitch angle α is defined as the radial angle made between the injected secondary flow and the horizontal plane, and may be of a suitable magnitude to improve turbine performance depending on the turbine operating conditions, turbine design and location of the at least one injection opening 11. Pitch angles larger than 90° (i.e. the secondary flow 50 is in an opposite direction to the flow in the main passage 66) are not recommended as the turbine performance decreases. It should be noted that when the secondary flow 50 of fluid is injected into the primary flow in the main passage 66, the secondary flow 50 is necessarily also injected into the clearance 20 between the shroud 10 and the blade tips 82 (210 in FIG. 33) as the secondary flow 50 must pass through the clearance 20 before it reaches the main passage 66.

In this second embodiment of the method 200, the injected secondary flow 50 increases the turbine performance through reducing separation and inhibiting secondary flow in the turbine main passage 66. This is different from the first exemplary embodiment of the method 200 of injecting with minimal interaction with the main passage flow, in that the main source of turbine efficiency improvement in the secondary exemplary embodiment of the method 200 comes from reduced flow separation within the main passage 66.

For all embodiments of the method 200 to improve efficiency of the radial/mixed flow turbine 300, the secondary flow 50 of fluid may be injected at a yaw angle γ relative to the rotational axis R of the rotor 90, the yaw angle γ being on the θ-z plane at the at least one injection opening 11 as shown in FIGS. 8 and 13. Referring to FIG. 8, the injection yaw angle γ is defined as the angle between the flow and the z-axis on the θ-z plane, with a positive yaw angle γ in the same direction as the rotation of the turbine 300. The yaw angle γ should be in a same direction from the rotational axis R as a direction of rotation of the rotor 90, and is preferably as large as possible, i.e., almost parallel to direction of rotation of the rotor 90, but below 90° as it is physically difficult to turn a flow so much. Negative injection yaw angles (i.e. injecting in an opposite direction as turbine rotation) are not recommended as the turbine performance decreases when the yaw angle γ is negative.

For all embodiments of the method to improve efficiency of the radial/mixed flow turbine, injection of the secondary flow may be performed under pulsed flow conditions, i.e., the secondary flow is injected in pulses to improve turbine performance when instantaneous incidence angles are not good. For example, when the turbine housing of the present invention is provided in the turbine of a turbocharger coupled to an internal combustion engine (as shown in FIG. 17), injection of the secondary flow can be timed to be out of phase with the pulse of the engine exhaust, so that during periods of low exhaust mass flow (bad incidence), injection of the secondary flow can be activated to provide a performance boost. Source of air for the secondary flow in the turbine of the turbocharger may comprise (and is not limited to) one or more of the following: exhaust gas obtained from the engine (3), bleed air obtained from a compressor of the turbocharger (5), external air (i.e. ambient) (9) provided via another (e.g. small) compressor (6), or exhaust gas from the turbine (10) that is fed into the small compressor and injected back into the turbine as the secondary flow (6).

Figure 20:
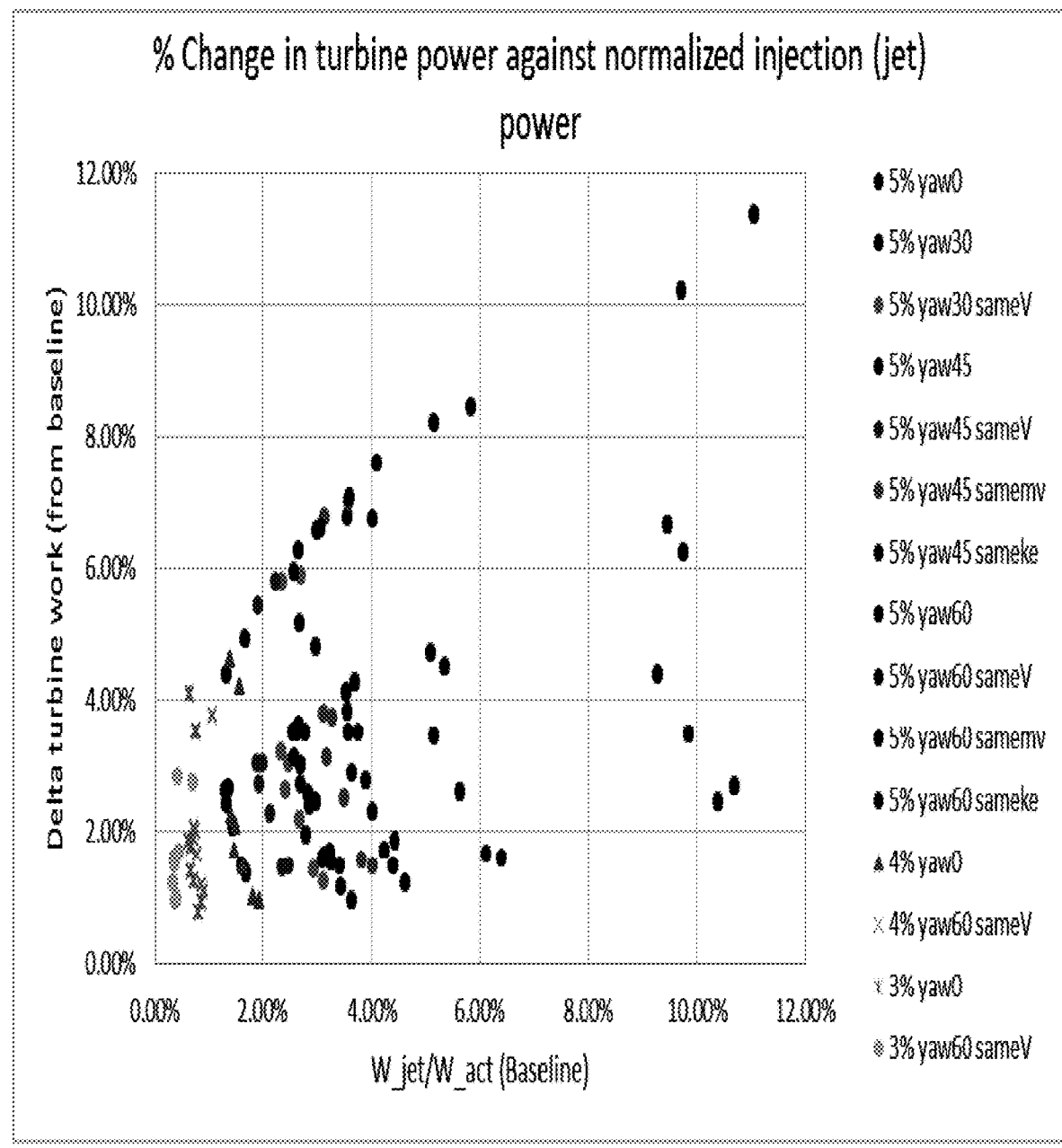
FIG. 20 is a plot of % change in turbine power showing turbine power increase arising from use of the turbine housing and method of the present invention.
Figure 21:
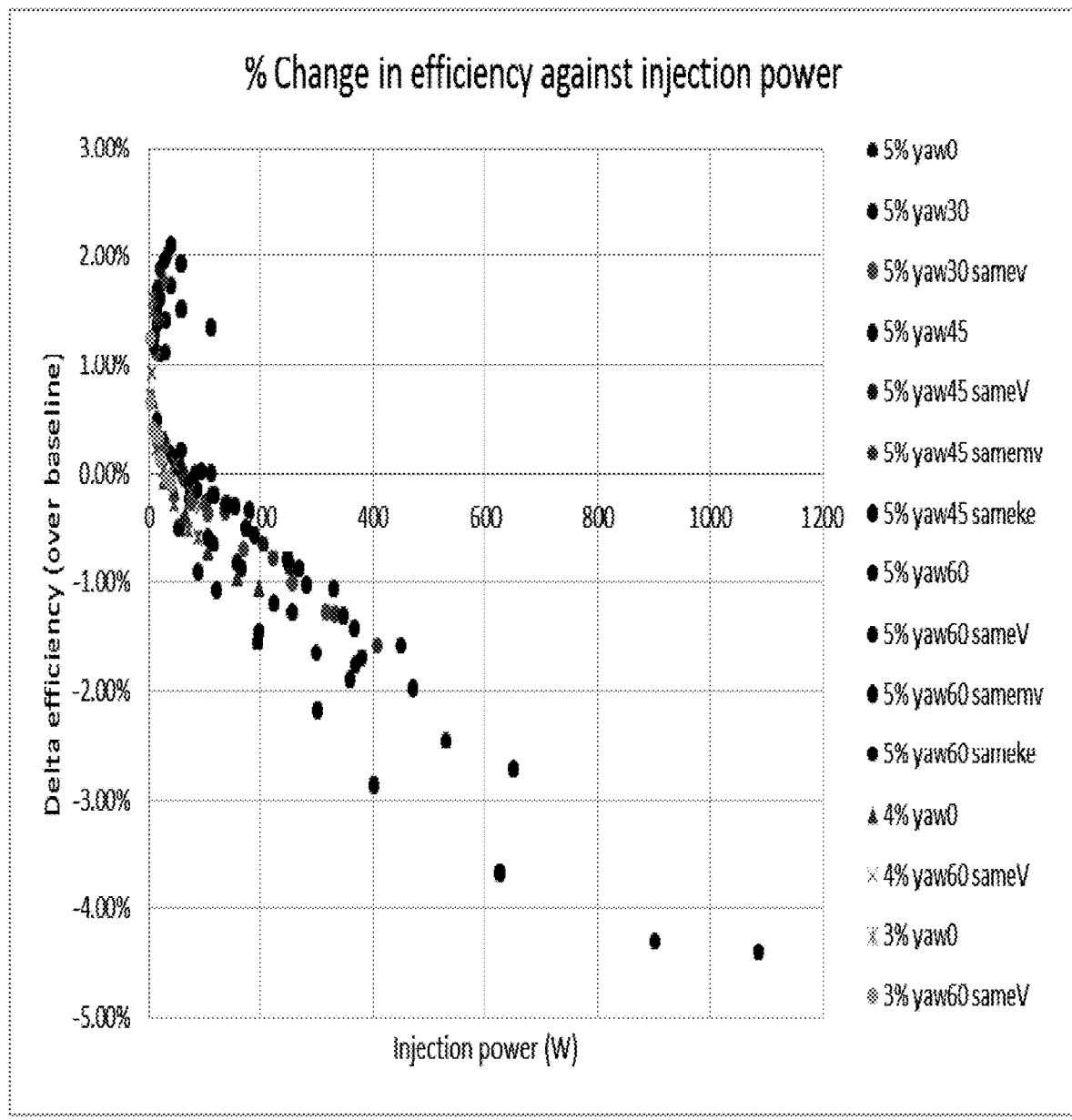
FIG. 21 is a plot of % change in turbine efficiency showing improvements in turbine efficiency arising from use of the turbine housing and method of the present invention.

The effect of the first exemplary embodiment of the method 200 of secondary flow injection on the turbine is clearly seen in the CFD simulation shown in FIGS. 18A, 18B, 18C, and 18D at VR=0.7 for: a) baseline, b) injection 0° yaw, c) injection 30° yaw, and d) injection 45° yaw, showing clearly an increase in low pressure region. The low pressure region is clearly seen in comparing baseline (a) and turbine with injection (b, c, d). This low pressure region directly leads to the improved suction side blade tip loading, seen in FIG. 19 for a selected few cases. The improved blade loading characteristics leads to increased turbine power, as shown in FIG. 20. Due to additional mixing losses resulting from the high velocity fluid in the secondary flow injection mixing with the main passage flow, the turbine efficiency does not always see an increase, as seen in FIG. 21. However, by careful calibration of the injection mass flow rate and the flow angle, positive improvements in efficiency can still be achieved.

Figure 22:
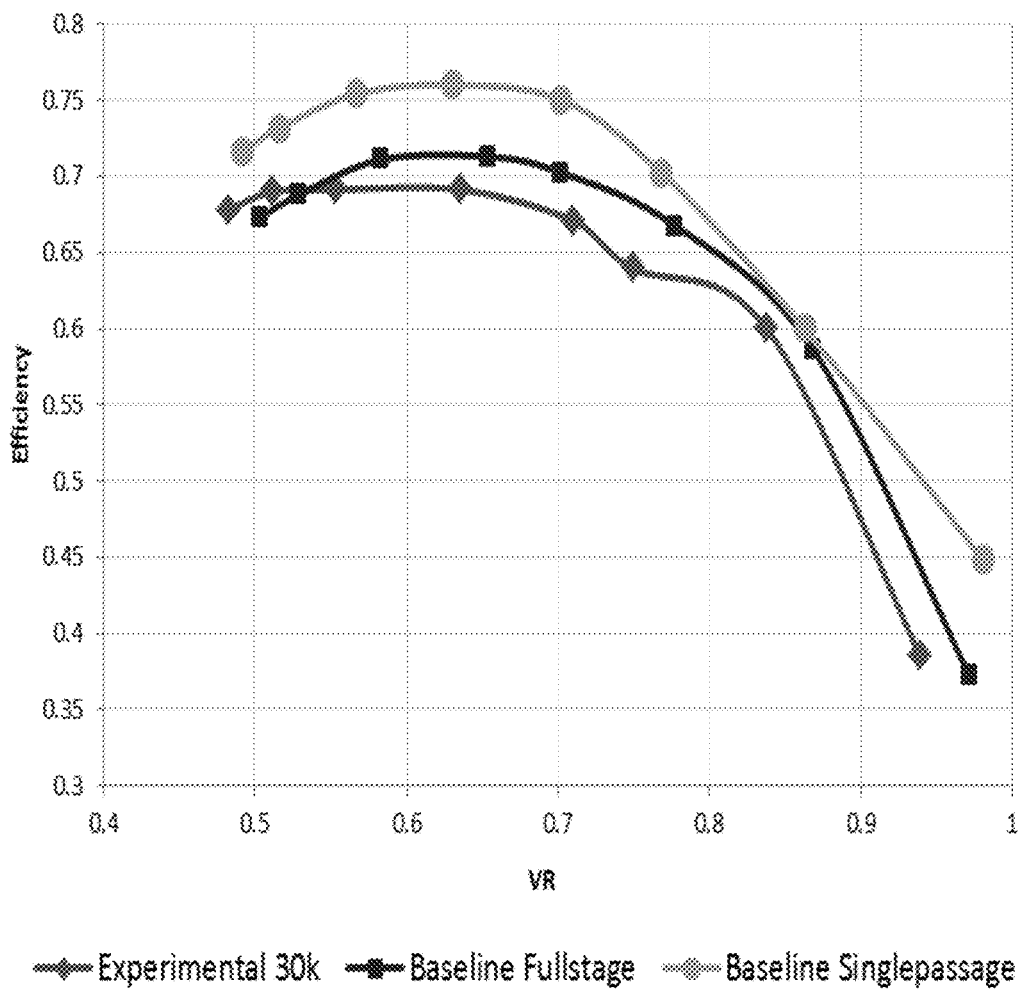
FIG. 22 is a plot of turbine efficiency for baseline single passage computational fluid dynamics (CFD) simulation and full stage CFD simulation compared with experimental results

FIG. 22 shows the comparison of the computational fluid dynamics (CFD) simulation work for the single passage baseline turbine (circle), full stage baseline turbine (square) and experimental data for the baseline turbine (diamond). It can be seen that both the full stage and single passage simulations have efficiencies higher than the experimental results, with the single passage simulations obtaining higher efficiencies than both the full stage and experimental results. Also, the velocity ratio at which peak efficiency occurs is also slightly higher than the experimental value. However, despite the differences, the general trend is captured well, and both single passage and full stage simulations show a similar shape in the efficiency curve. A likely reason for the discrepancy between simulations and experimental values is that due to errors in modelling, such as the assumption of a smooth wall in simulations, which will result in less frictional losses in the passage and thus higher efficiencies. For the single passage simulations, the simulations only include the rotor. Thus, volute losses and losses through the vanes are not accounted for, and thus the resulting efficiencies obtained were higher.

An exemplary optimization of the width and location of the injection slot of an exemplary turbine housing 100 with secondary flow 50 injection as shown in FIG. 7 was performed using a Genetic Algorithm at a single point for an exemplary mixed flow turbine having turbine geometric parameters given in Table 1 below:

TABLE 1

| Turbine Geometric Parameters | |
|---|---|
| Leading edge tip diameter (mm) | 95.14 |
| Trailing edge tip diameter (mm) | 78.65 |
| Cone angle (°) | 40 |
| Leading edge blade angle (°) | 20 |
| Length of axial chord (mm) | 40 |
| Number of blades | 12 |

The optimized injection parameters are shown in Table 2 below:

TABLE 2

| Optimised Injection Parameters | |
|---|---|
| Parameter | Optimized value |
| Slot Location (from blade tip LE) | 5.5 mm |
| Slot Width | 5 mm |

TABLE 2-continued

Optimised Injection Parameters

| Parameter | Optimized value |
|---|---|
| Injection Velocity | 116 m/s |
| Injection Yaw Angle | 80° |
| Injection Pitch Angle | 60° |

Through optimization, it was found that by allowing the injected secondary flow to more greatly influence the entire passage flow, greater improvements in turbine efficiency can be achieved. This will be discussed in the following sections.

3-D CFD Methodology

A commercial software ANSYS ICEM-CFD was used as the meshing platform as its blocking features allows for flexible meshing especially for a multi-body geometry such as the turbine housing. The generated mesh blocks were divided to allow for different meshing patterns for individual blocks. The generated mesh had 537000 nodes for the baseline cases and 506000 nodes for the injection cases. This mesh density has previously been shown to be adequate to resolve the flow features within a turbine passage (Newton et al., 2015).

3-D numerical simulation was performed using a commercial software ANSYS CFX. The k-epsilon turbulence model was chosen as it is widely used in turbomachinery simulations and is able to produce reasonable accuracy in turbomachinery applications.

Both baseline (no injection) and injection simulations were conducted. For the simulations, mass flow rate boundary condition was imposed at the domain inlet, with a total temperature of 333 K. For the outlet, a static pressure of 1 atmosphere was imposed. The domain inlet angle was tuned to match the experimental pressure ratio. Periodic boundary condition was set up at the sides of the passage. The simulations were conducted at a rotational speed of 30,000 rpm, which was 50% of the design speed of the turbine, to assess the impact of injection at engine part-load conditions. The mass flow rate of the turbine was varied to obtain a set of performance results.

Injection Simulation Set Up

The validated baseline model was modified to include the injection slot 11. The shroud curves used in the creation of single passage was modified to include a slot, which in the geometry is an additional surface on the shroud, as shown in FIG. 6.

A velocity inlet was imposed as the boundary condition at the secondary inlet. The injected flow has a total temperature of 333 K, similar to the inlet total temperature of the main passage flow. The simulation was conducted on a single passage. For the secondary flow injection simulations, the injection yaw angle γ and pitch angle α (as described above with reference to FIGS. 8 and 10 respectively) were varied.

A total of 8 operating points were simulated, as shown herein below:

TABLE 3

Turbine Operating Points

| Point | Rotor mass flow rate (kg s$^{-1}$) |
|---|---|
| 1 | 0.13015 |
| 2 | 0.16375 |
| 3 | 0.19887 |
| 4 | 0.23262 |
| 5 | 0.26012 |
| 6 | 0.31115 |
| 7 | 0.36284 |
| 8 | 0.39379 |

In the simulation results, point 5 had the highest isentropic efficiency, and was the point chosen to conduct the optimization. A total of 3 operating points were chosen for detailed flow analysis: Point 1 (lowest mass flow), Point 5 (highest efficiency), and Point 8 (highest mass flow). The selected points are shown in bold as shown herein above.

Turbine Performance

To assess the performance characteristics of the turbine, a set of performance parameters specifically for simulation with injection was used.

Isentropic Efficiency

For a turbine with a secondary injection system, the additional isentropic power of the injected flow should be considered in the efficiency calculations. Assuming that the injected flow expands isentropically to ambient pressure as well, the isentropic efficiency for a turbine with secondary injection can be calculated as follows:

$$\eta_{TS,inj} = \frac{W_{act}}{W_{s,inj}} \quad (1)$$

Where $$W_{s,inj} = \dot{m}_{main} C_p (T_{03} - T_{4s}) + \dot{m}_{inj} C_p (T_{0,inj} - T_{4s}) \quad (2)$$

The state variables such as temperature and pressure can be easily obtained from post-processing.

Isentropic Velocity Ratio (VR)

The isentropic velocity ratio is defined as the ratio between the actual rotor inlet tip velocity to the velocity achieved through an isentropic expansion through the turbine at the given pressure ratio (Whitfield and Baines, 1990). With injection, the isentropic velocity is given by:

$$C_s = \sqrt{2 W_{s,inj} d(\dot{m}_{main} + \dot{m}_{inj})} \quad (3)$$

The isentropic velocity ratio is then given by:

$$VR = \frac{U_3}{C_s} \quad (4)$$

Figure 23:
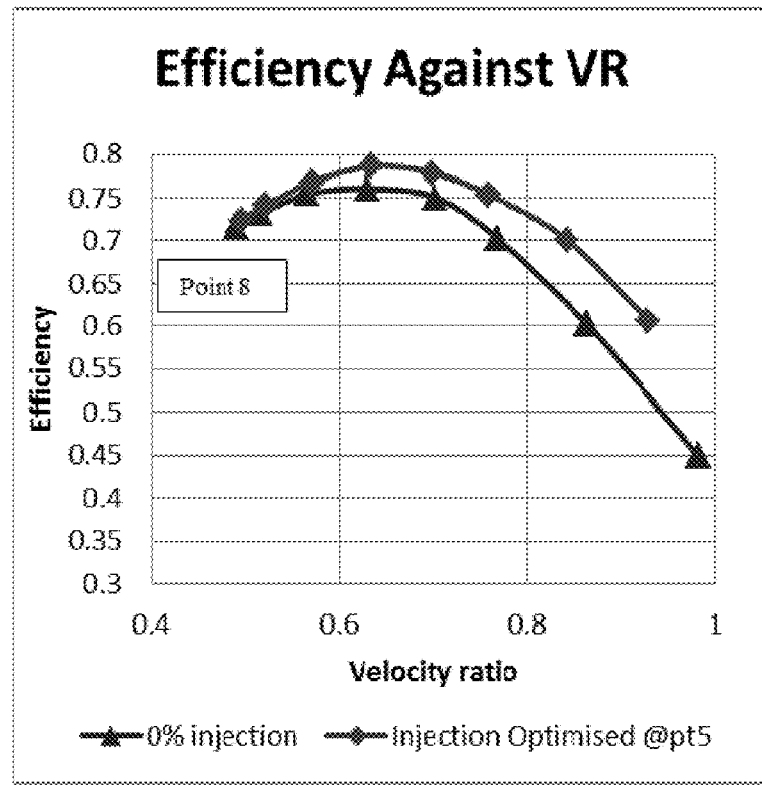
FIG. 23 shows turbine efficiency curves for baseline and injection cases.

FIG. 23 shows the efficiency against VR curves for injection compared with baseline. The graph shows that in general, injection increases the total to static isentropic efficiency throughout all the operating points, with a 2.6 percentage point efficiency increase at the optimised peak efficiency point (Point 5). The increase in efficiency is larger at higher VR (lower mass flow rate).

In order to visualise the localised losses within the rotor passage, entropy generation rate, calculated using the method described in (Herwig and Kock., 2007), was used. To compare the entropy generation rates across different cases, the entropy generation rate was normalised by dividing with the isentropic work of the turbine.

$$\dot{S}_{gen,norm} = \frac{\dot{S}_{gen}}{W_{s,inj}} \quad (5)$$

Flow in Baseline Passage

Figure 24A:
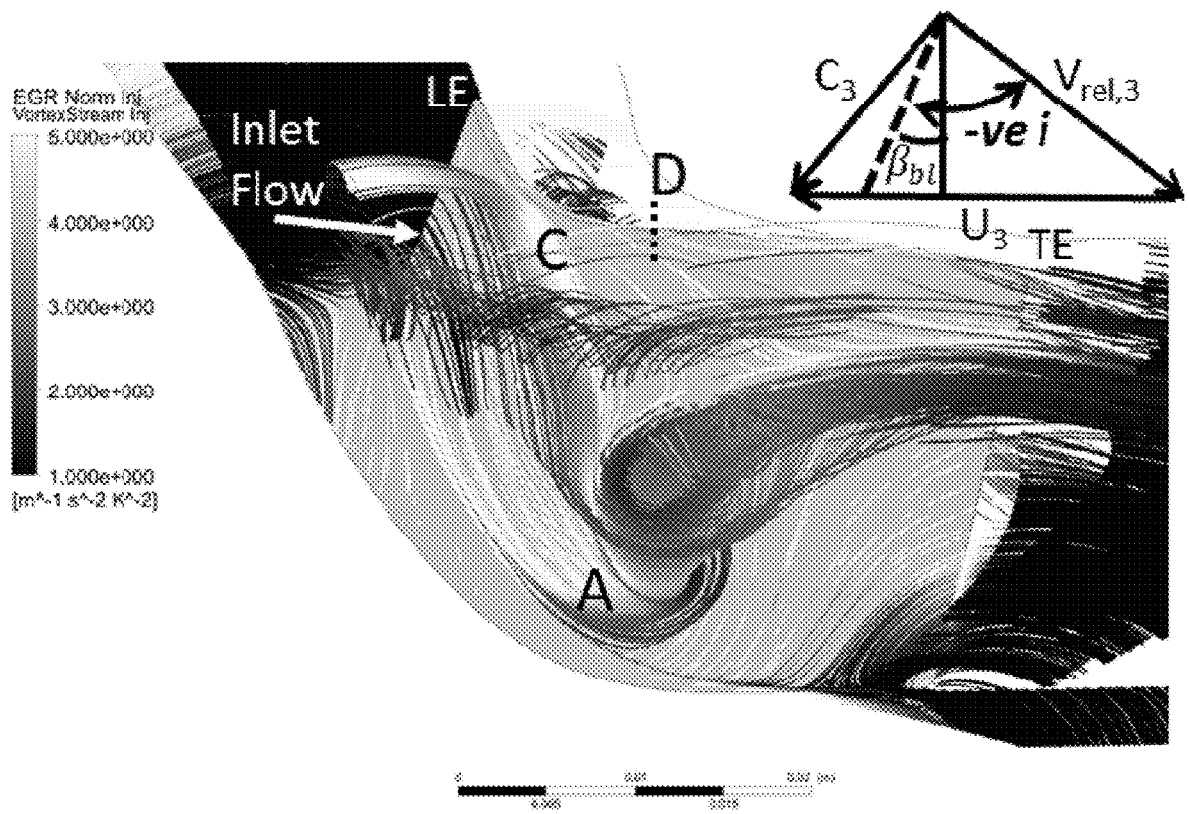
FIG. 24a shows streamlines within the turbine passage for a baseline case, suction side, for turbine operating point 1.
Figure 24B:
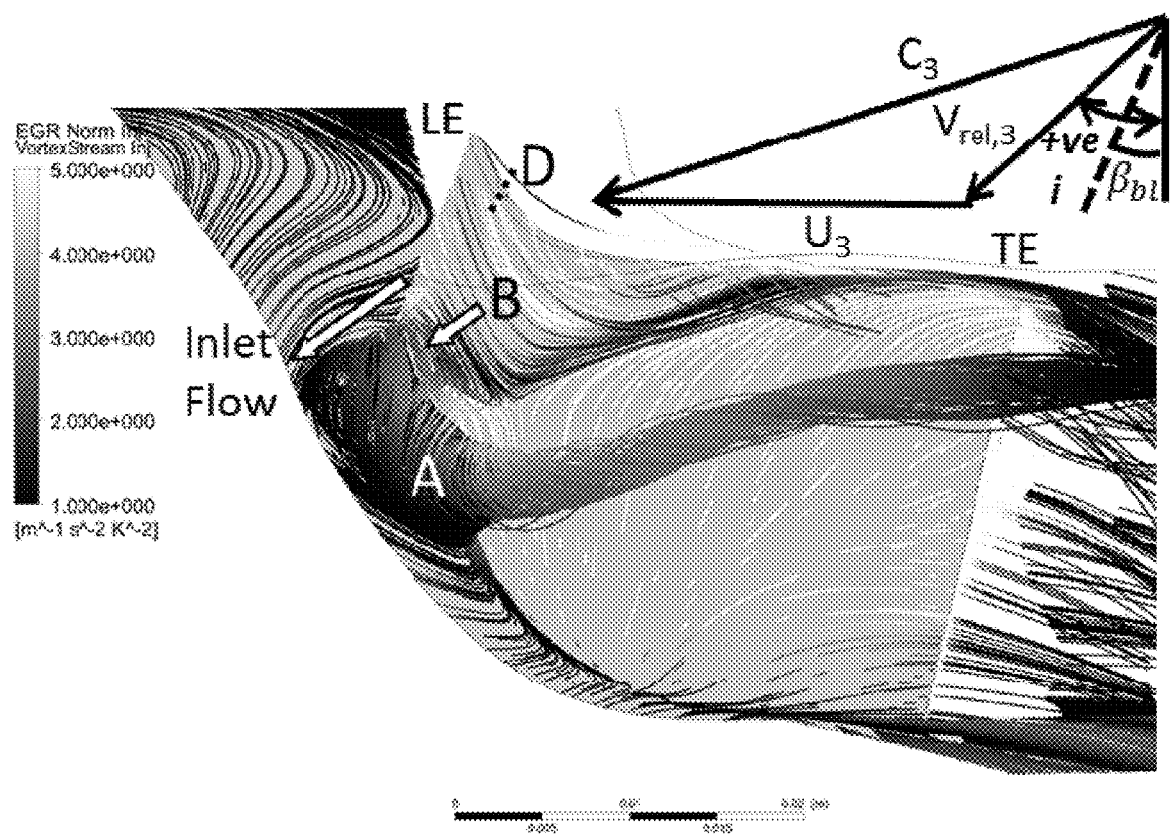
FIG. 24b shows streamlines within the turbine passage for a baseline case, suction side, for turbine operating point 5.
Figure 24C:
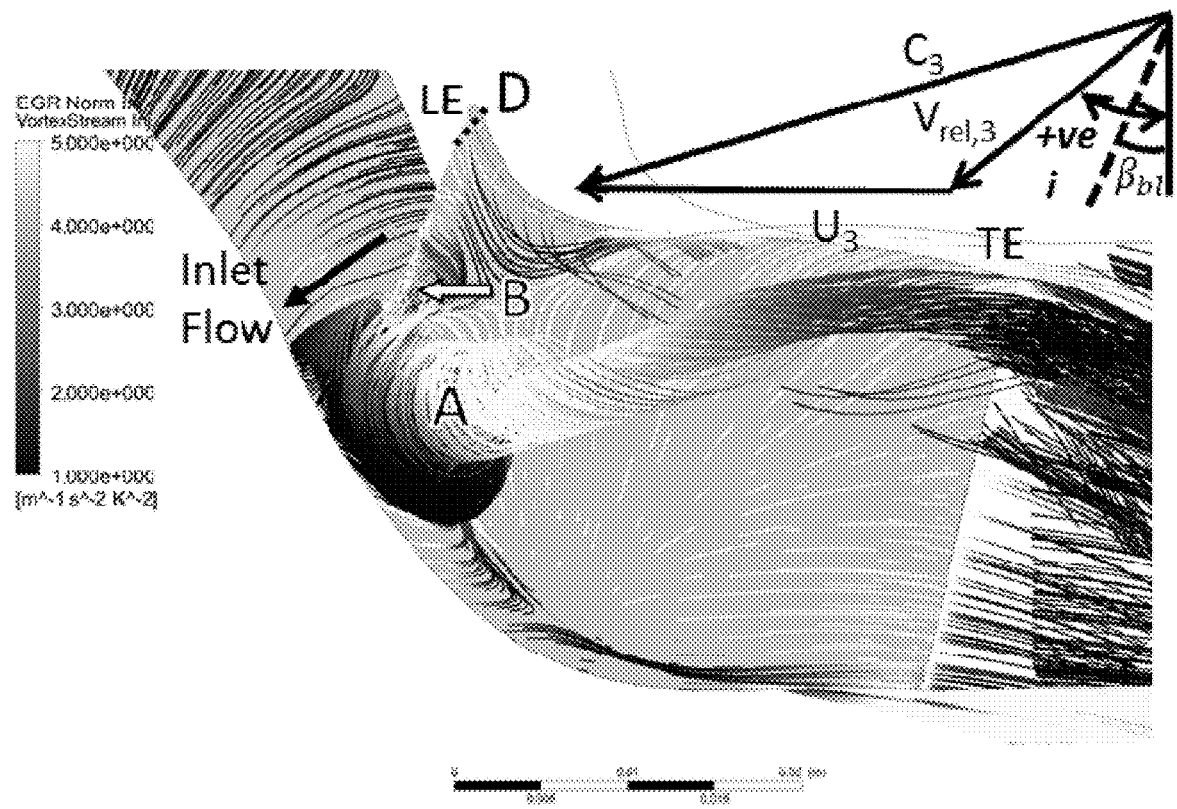
FIG. 24c shows streamlines within the turbine passage for a baseline case, suction side, for turbine operating point 8.
Figure 25:
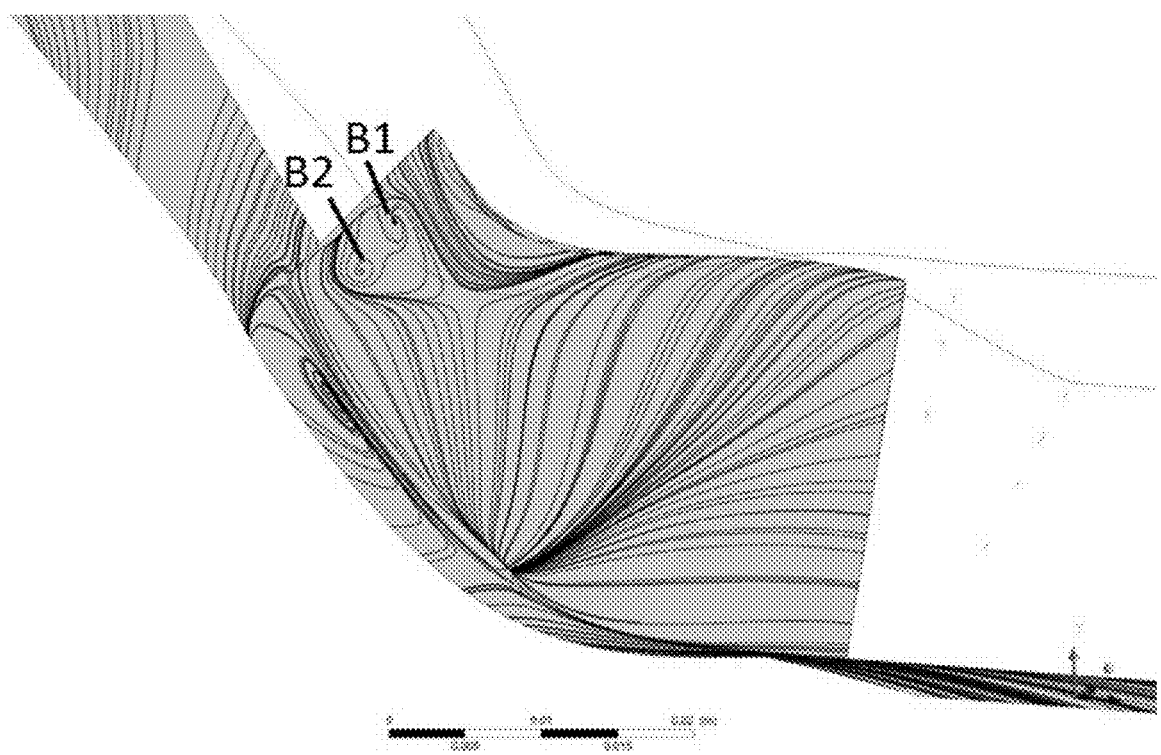
FIG. 25 shows surface streamlines for a baseline case, suction side, for turbine operating point 8.

FIGS. 24a to 24c show the flow within the rotor passage for the baseline cases for points 1, 5 and 8 on the suction surface and pressure surface respectively. The streamlines are coloured by the normalised entropy generation rate. The figures show that the flow structures are rather different in point 1 (FIG. 24a) as compared to point 5 (FIG. 24b) and point 8 (FIG. 24c). At point 1 (FIG. 24a) there is a large separation vortex on the suction surface of the blade at about ⅔ chord length and 25% span, labelled A. A separation vortex appears on the suction surface in points 5 and 8 labelled B, but they are closer to the leading edge and on the suction-surface-hub corner. This difference can be attributed to the difference in incidence between point 1 (FIG. 24a) and points 5 and 8 (FIGS. 24b and 24c). From FIGS. 24a to 24c, it can be seen that there is negative incidence on the leading edge of the blade at point 1 (FIG. 24a), but positive incidence at points 5 and 8 (FIGS. 24b and 24c), as shown by the velocity triangles. Therefore, for point 1 (FIG. 24a), no separation occurs on the suction surface near the front of the blade, as the incidence angle is favourable to the suction surface. As the flow approaches nearer the aft of the blade, it approaches an unfavourable pressure gradient and separates, and this separated flow is turned towards the shroud and away from the suction surface due to the centrifugal and Coriolis forces, developing into the separation vortex A. For points 5 and 8 (FIGS. 24b and 24c), the positive incidence angle causes separation to occur very near the leading edge, and the resulting separation vortex does not migrate as much away from the suction surface, presumably because the higher meridional velocity of the fluids help keep the flow stay in direction. Also to be noted is that a smaller vortex B is formed right above the hub separation vortex in points 5 and 8 (FIGS. 24b and 24c), which soon merges with the hub separation vortex. For point 8 (FIG. 24c), this actually consists of two vortices B1 and B2, shown by the surface streamlines in FIG. 25. The mechanism for the formation of this smaller vortex structure is not yet clear, but its apparent contribution to overall entropy generation is not significant.

Figure 26:
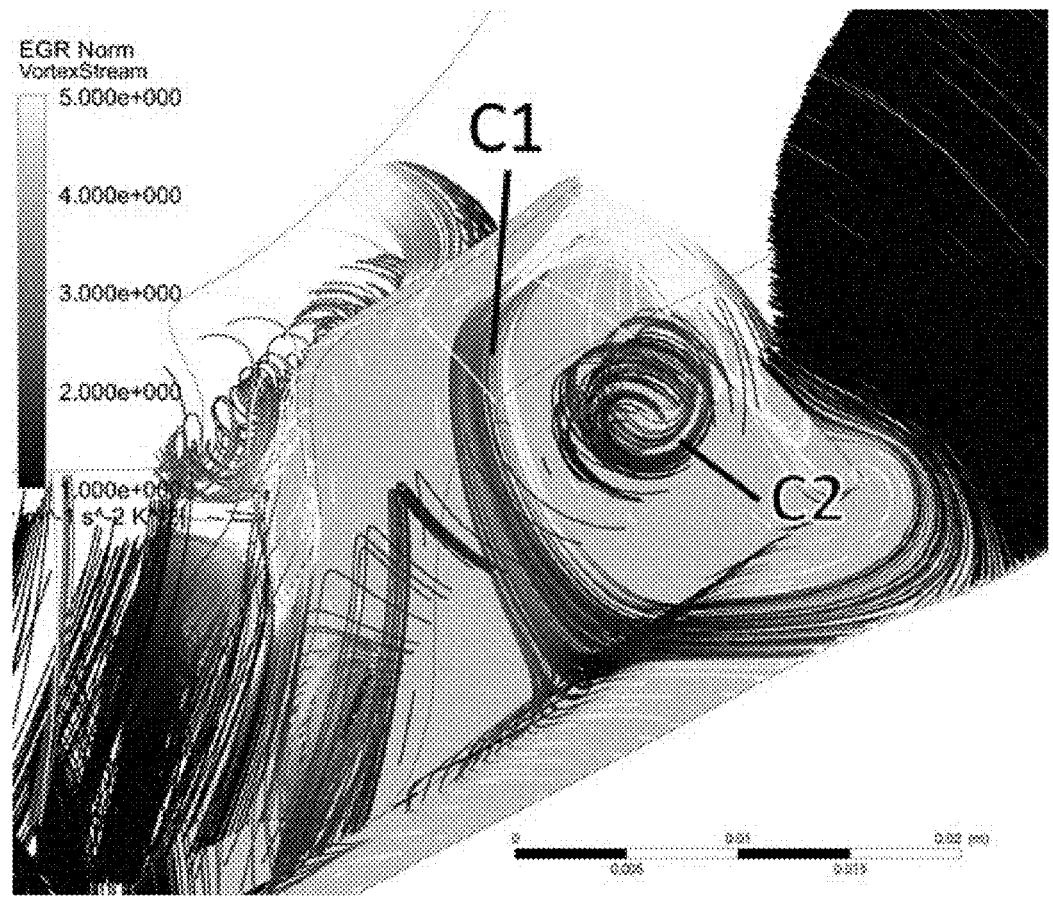
FIG. 26 shows streamlines within the turbine passage for a baseline case, pressure side, for turbine operating point 1.

The negative incidence in point 1 also results in separated flow on the pressure surface, which then reattaches and migrates towards the shroud and then rolls up into another separation vortex. This is labelled C1 and C2 in FIG. 26. There are two main features of this separation vortex. Feature C1 is the fluid originating from the hub that is entrained by the vortex and migrates to the shroud. This fluid then turns due to the vortex and hits the suction surface of the adjacent blade. This is labelled C in FIG. 24 a. This stream of fluid then migrates towards the hub and rolls up into the suction side separation vortex. Feature C2 in FIG. 26 is the core of the pressure side separation vortex. At points 5 and 8, as the incidence angle is positive, no such separation occurs on the pressure surface, and therefore the streamlines are not shown.

Figure 27A:
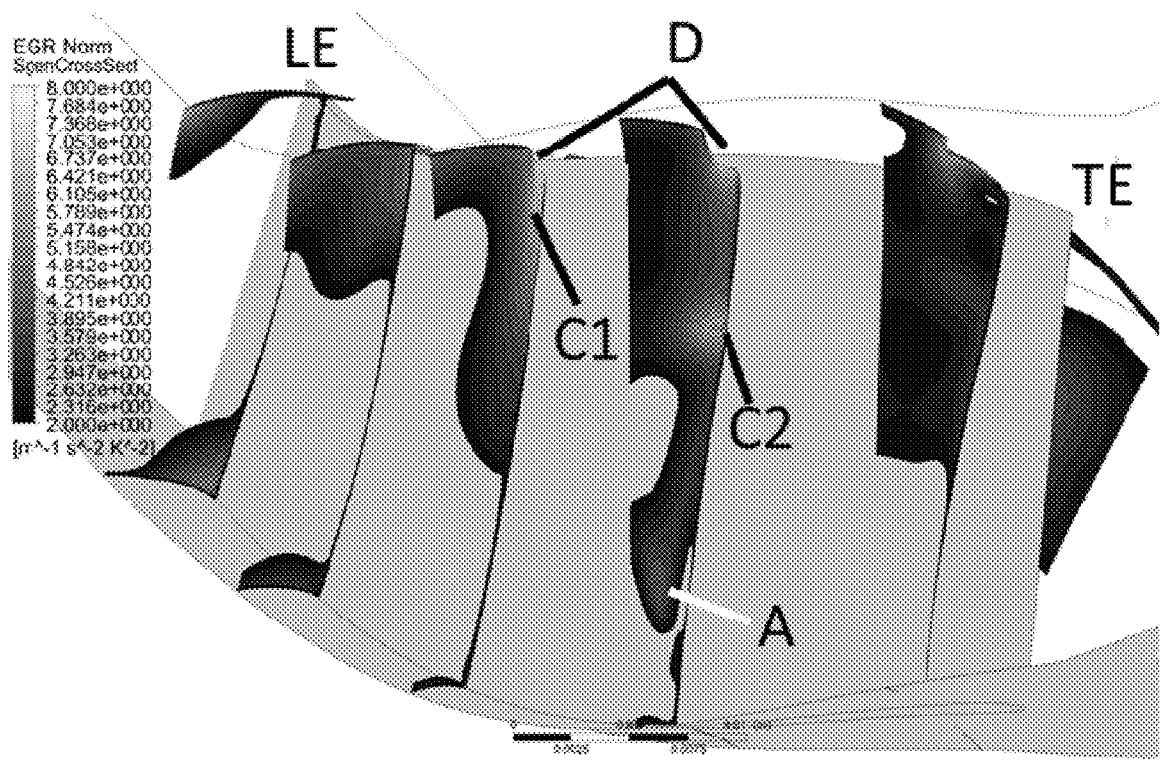
FIG. 27a shows contours of normalized entropy generation rate for a baseline case, suction side, for turbine operating point 1.
Figure 27B:
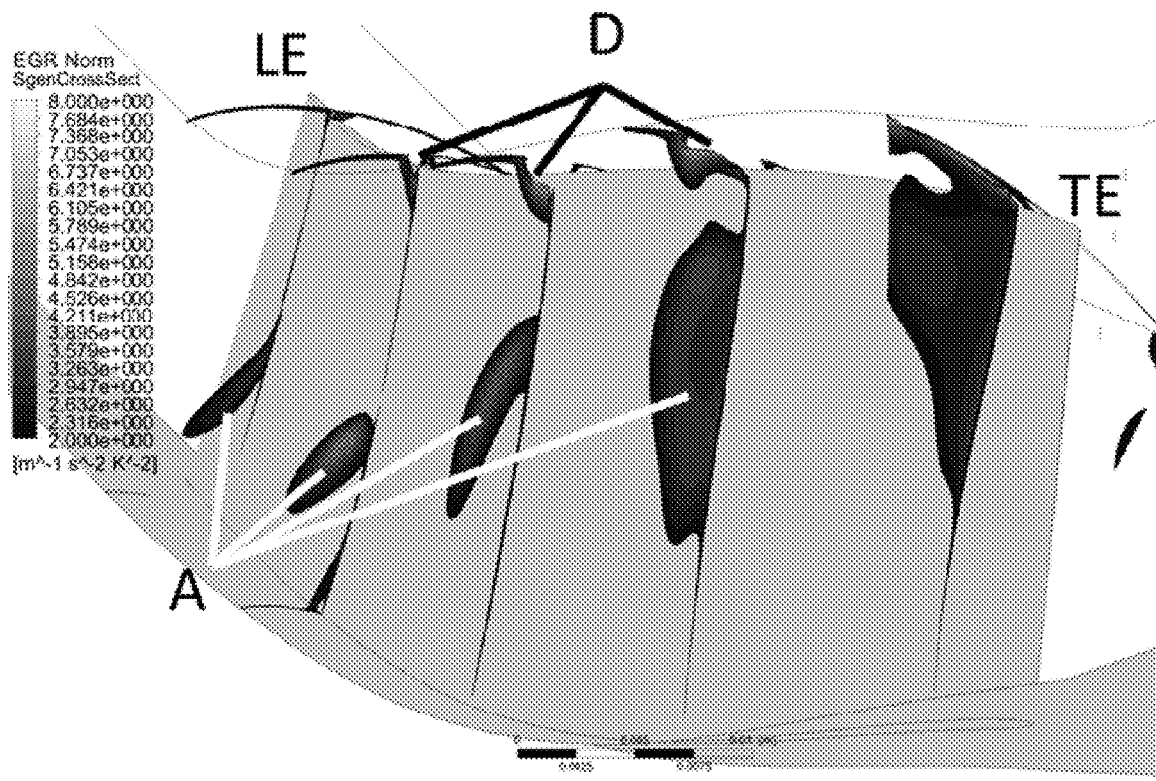
FIG. 27b shows contours of normalized entropy generation rate for a baseline case, suction side, for turbine operating point 5.
Figure 27C:
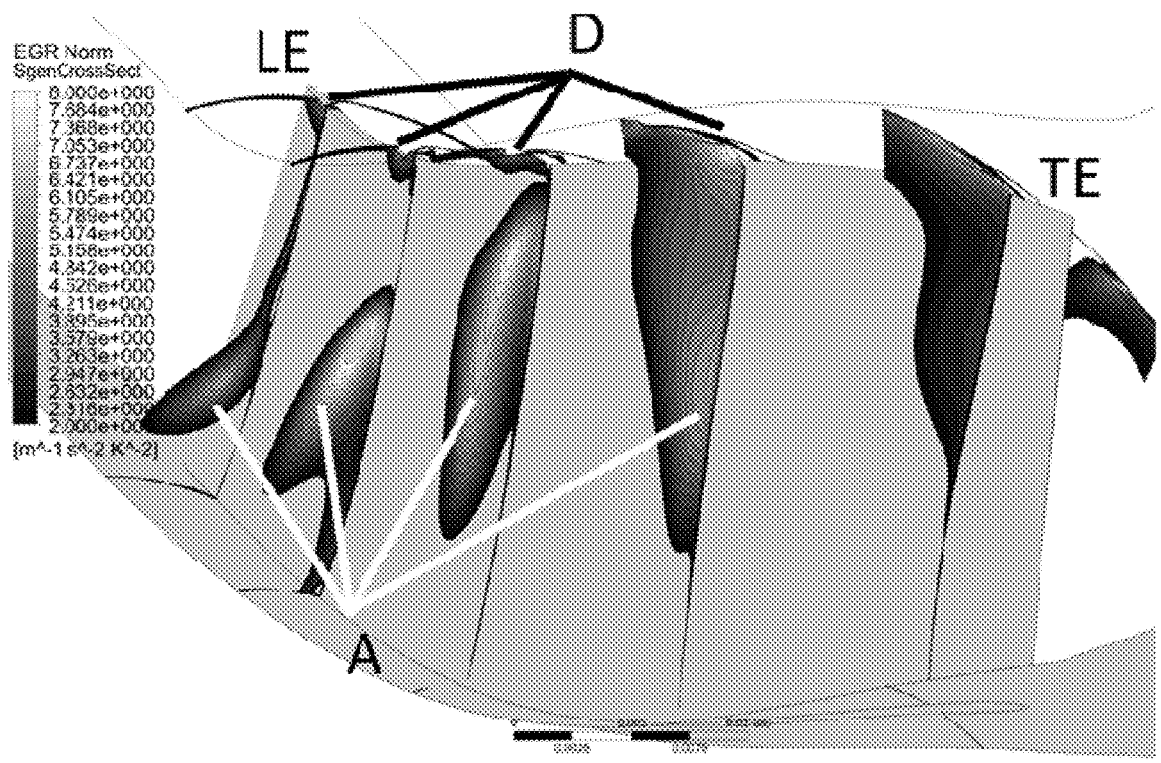
FIG. 27c shows contours of normalized entropy generation rate for a baseline case, suction side, for turbine operating point 8.
Figure 28:
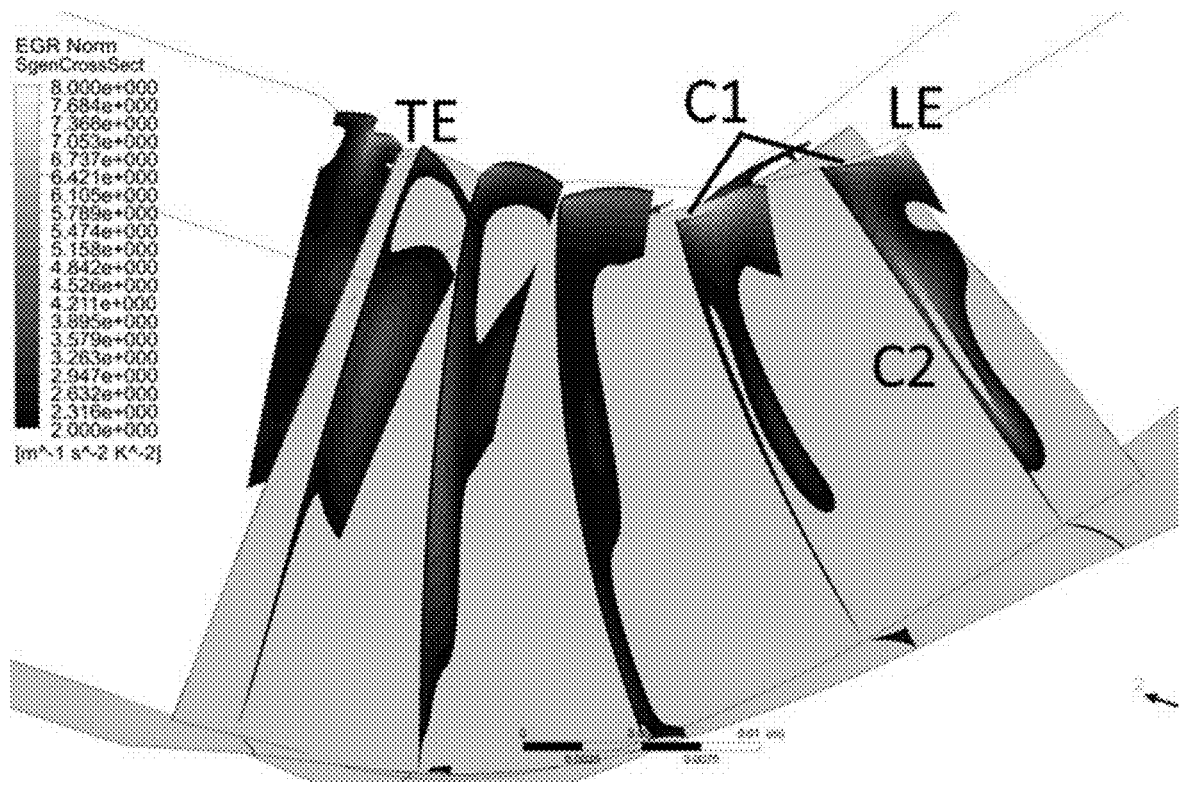
FIG. 28 shows contours of normalized entropy generation rate for a baseline case, pressure side, for turbine operating point 1.

For the baseline cases, the normalized entropy generation contours are shown in FIGS. 27a to 27c for the suction side for points 1, 5 and 8 respectively. The figures show a few main areas with high entropy generation. For point 1 (FIG. 27a), a relatively high entropy generation area associated with the suction surface separation vortex can be clearly seen, labelled A. In addition, there is a region of high entropy generation associated with the pressure side separation vortex, labelled C1 and C2. Region C1 corresponds to the strong secondary flow migrating from the adjacent pressure surface shown as C in FIG. 24a. Comparing region C2 with the streamlines in FIG. 24 seems to indicate that this is where the suction side separation vortex mixes with the core of the pressure side separation vortex which has also migrated towards the adjacent suction surface. The third region of high entropy generation rate is the tip leakage vortex, labelled D. The tip leakage vortex is relatively small in size at point 1 (FIG. 27a). For point 5 and point 8 (FIGS. 27b and 27c), the regions of high entropy generation rate associated with the suction surface separation vortex and the tip leakage flow can also be seen, labelled A and D respectively. For points 5 and 8, the high entropy region can be seen to be associated with the tip leakage vortex moving upstream. The smaller vortex structures above the suction side separation vortex in points 5 and 8 (feature B in FIGS. 24b and 24c) do not seem to contribute to significant entropy generation.

On the pressure side, there are 2 main regions of high entropy generation at point 1. Both of these are associated with the pressure side separation vortex. These are shown as regions C1 and C2 in FIG. 28. Region C1 corresponds to the secondary flow from hub to shroud that turns towards the adjacent suction surface (feature C1 as shown herein 7), while region C2 is associated with the core of the pressure side vortex. From the contours, it can be seen that the losses associated with the pressure side separation vortex is very significant.

Flow in Injected Passage

Figure 29A:
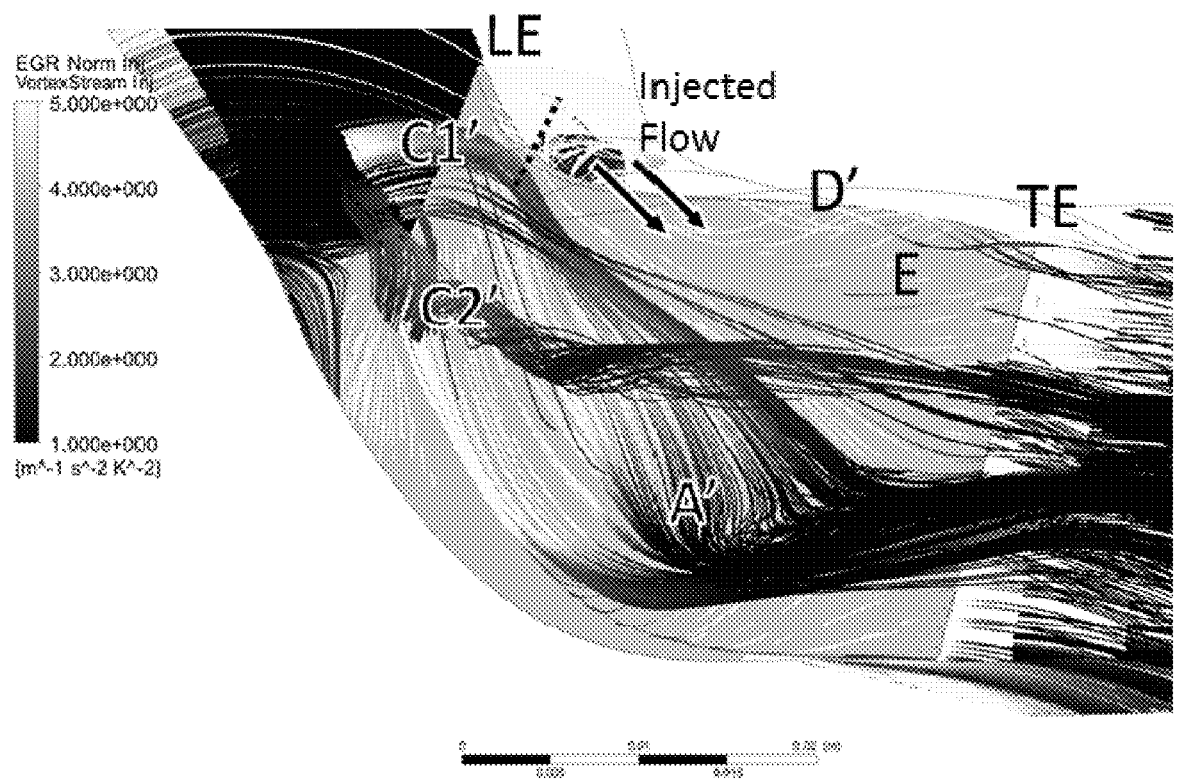
FIG. 29a shows streamlines within the turbine passage for an injection case, suction side, for turbine operating point 1.
Figure 29B:
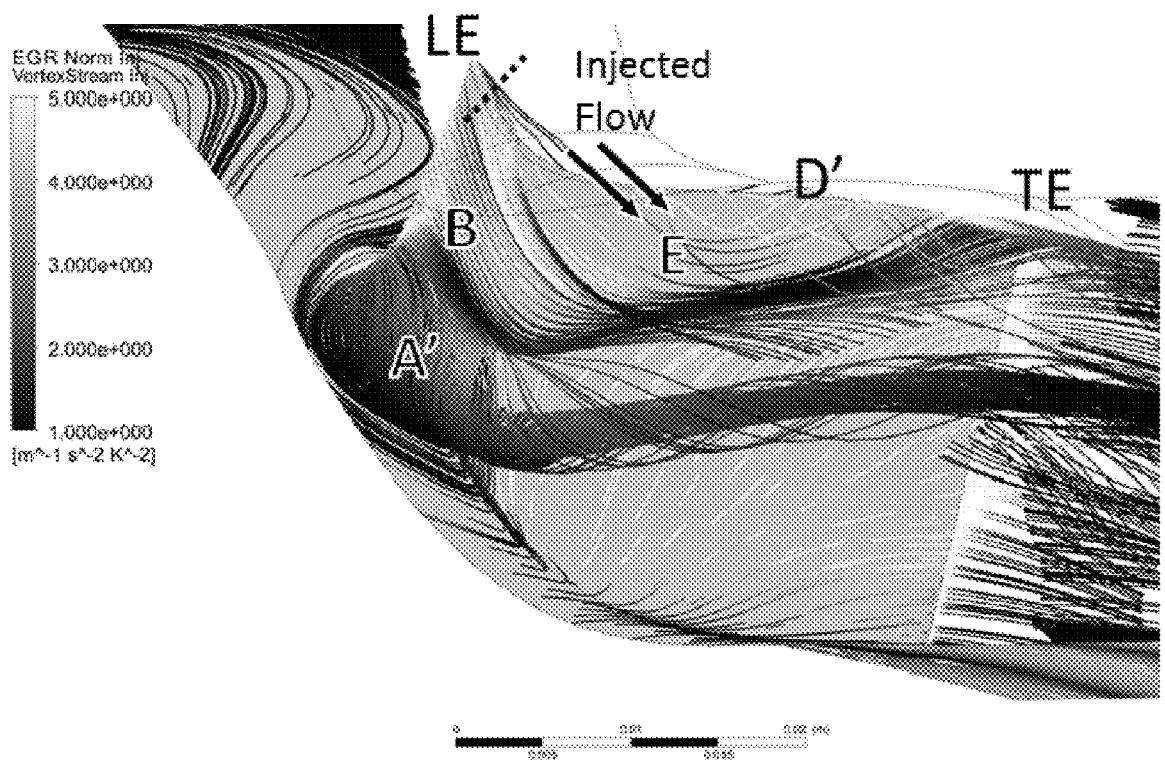
FIG. 29b shows streamlines within the turbine passage for an injection case, suction side, for turbine operating point 5.
Figure 29C:
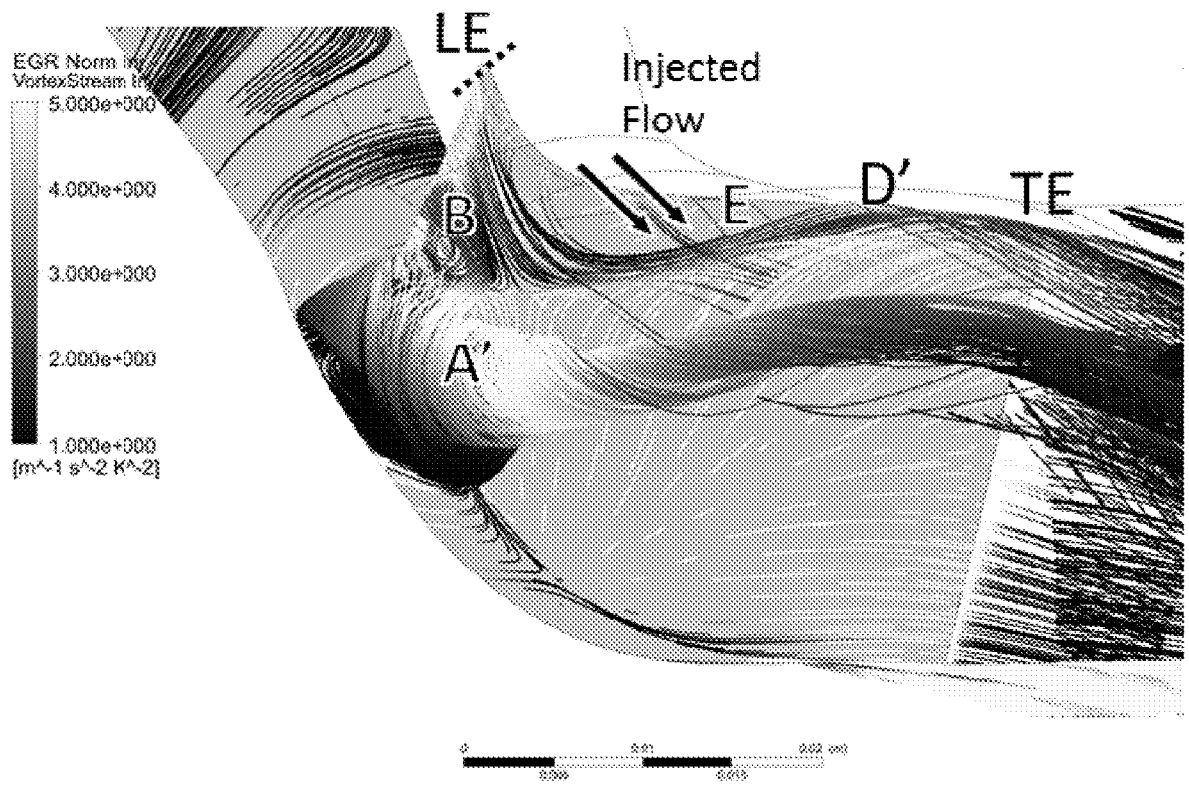
FIG. 29c shows streamlines within the turbine passage for an injection case, suction side, for turbine operating point 8.
Figure 30:
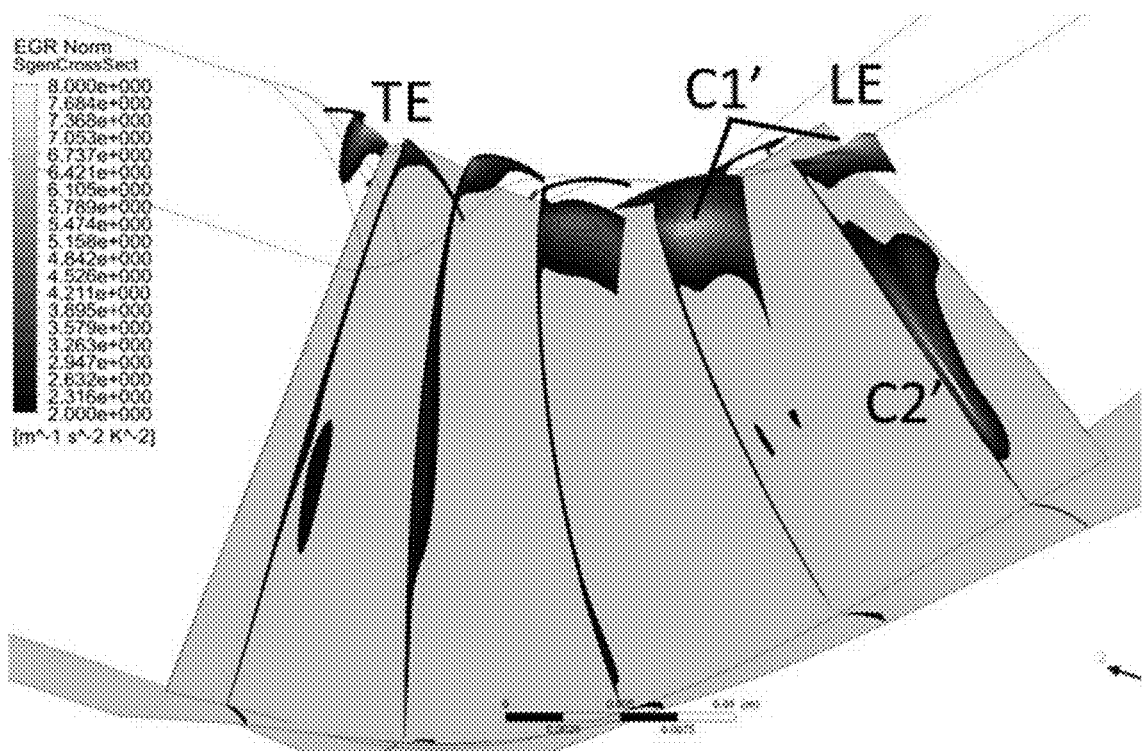
FIG. 30 shows contours of normalized entropy generation rate for an injection case, pressure side, for turbine operating point 1.

With injection, the flow structures within the rotor passage were changed. FIGS. 29a to 29c show the flow structures of the rotor passage with injection for points 1, 5 and 8 respectively.

For point 1 (FIG. 29a), the effects of injection on the suction surface separation vortex is very clear. The injected fluid enters from the blade tip towards the hub, inhibiting the formation of the separation vortex, as seen labelled A'. However, the pressure side separation vortex seems to have been given momentum by the injection, as seen in label C2', where the streamlines of the vortex are more structured and close together. The pressure side separation vortex and the strong secondary flow migration associated with it (C2' and C1' respectively) were also moved towards the hub. Injection has also been seen to weaken the suction side separation vortex in points 5 and 8 as well (FIGS. 29b and 29c), though it can be seen to be less effective as the turbine mass flow increases. This is within expectations, since a higher passage mass flow means higher velocities which have higher momentum, and the same amount of injection will have less effect.

The injected fluid also creates a partial blockage in the rotor passage, evident in FIGS. 29a to 29c in the regions labelled E, where the streamlines have been deflected towards the hub to form a pocket. This forces the flow through the passage through a smaller area, and thus forces the passage flow to more closely follow the streamwise direction. This likely helps in weakening the suction side separation vortex at all three operating points 1, 5 and 8.

A third effect of the injection is the strengthening of the tip leakage vortex, labelled D' in FIGS. 29a to 29c. This helps in improving blade loading near the blade tip.

The effects on the flow features on the pressure side for point 1 has already mentioned, while there is no significant change in flow on the pressure side for points 5 and 8 due to injection, thus the streamlines on the pressure side are not shown.

Figure 31A:
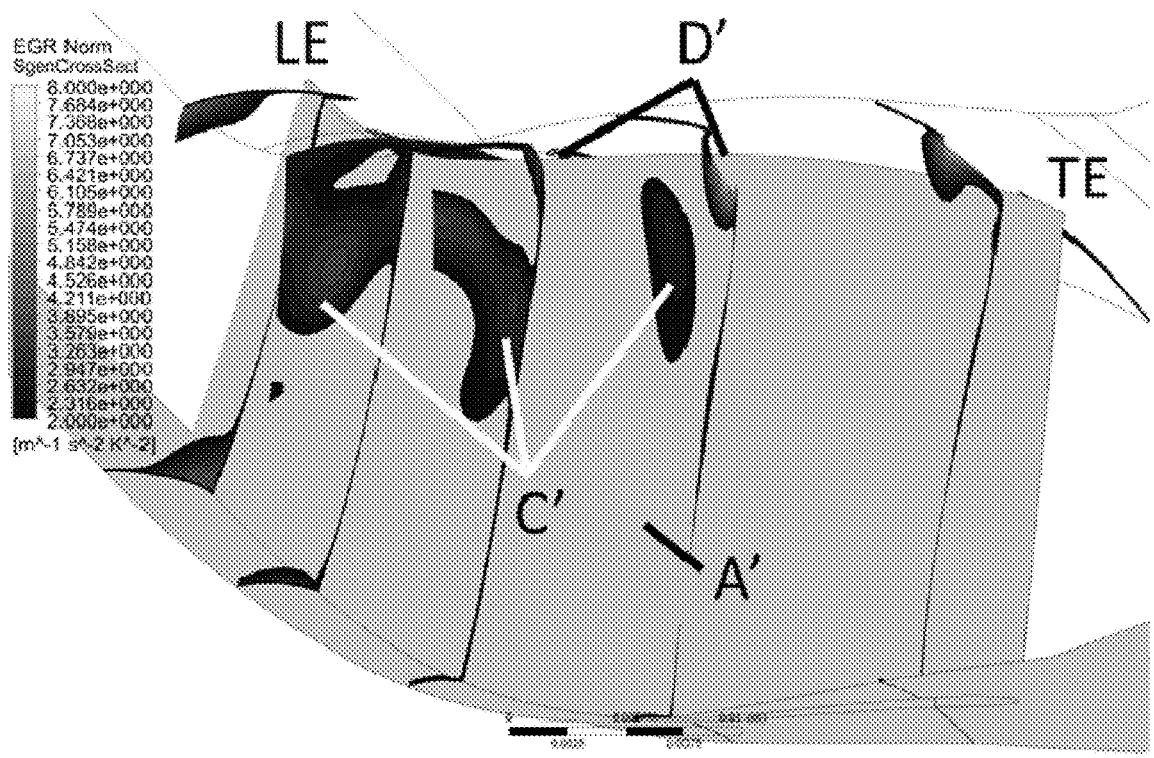
FIG. 31a shows contours of normalized entropy generation rate for an injection case, suction side, for turbine operating point 1.
Figure 31B:
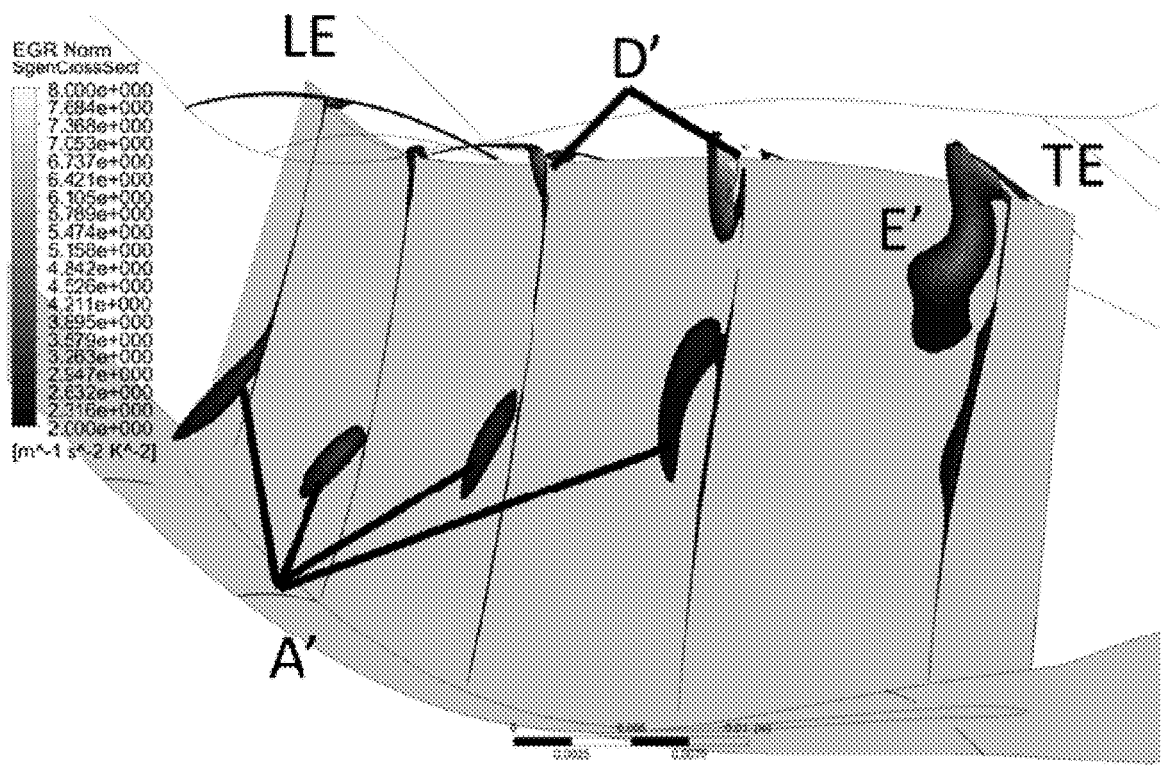
FIG. 31b shows contours of normalized entropy generation rate for an injection case, suction side, for turbine operating point 5.
Figure 31C:
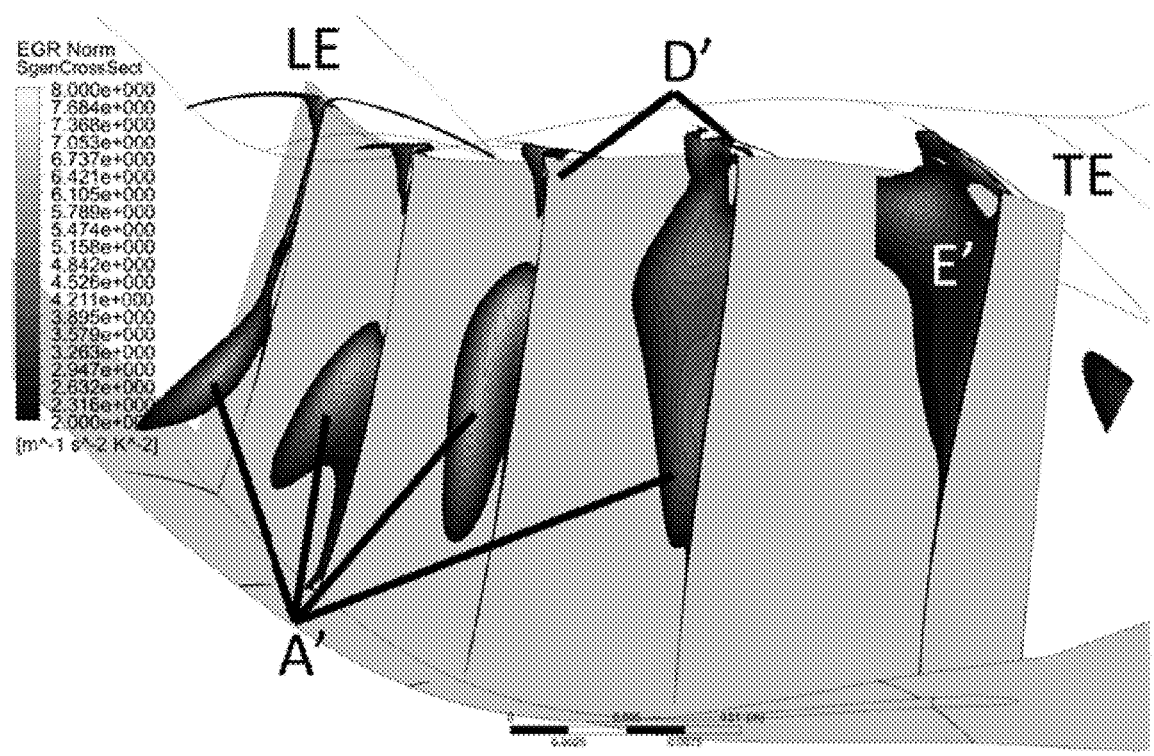
FIG. 31c shows contours of normalized entropy generation rate for an injection case, suction side, for turbine operating point 8.
Figures 32A, 32B:
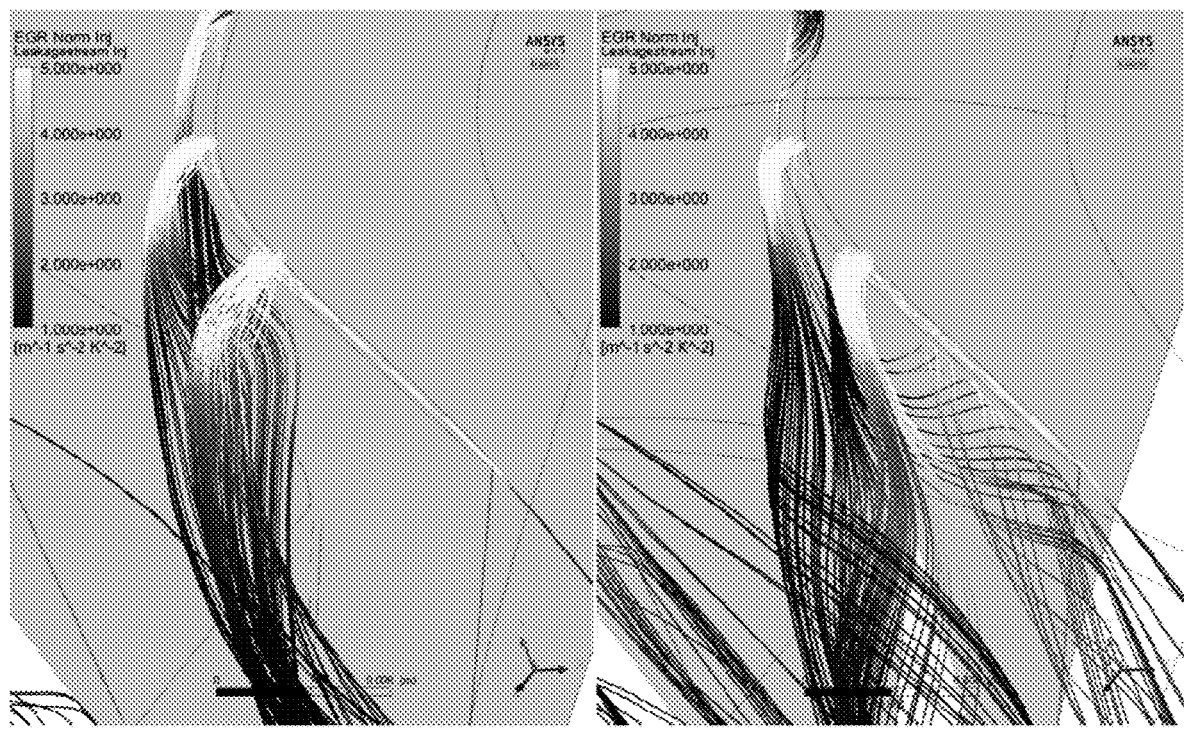
FIG. 32a shows tip leakage flow structure for a baseline case, for turbine operating point 5.
FIG. 32b shows tip leakage flow structure for an injection case, for turbine operating point 5.
Figure 33:
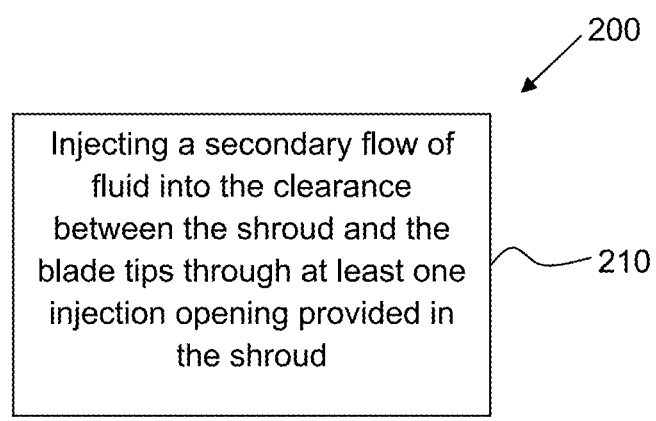
FIG. 33 is an illustration of a method of improving efficiency of a radial/mixed flow turbine.

The effects of injection on the rotor losses can be seen from FIGS. 31a to 31c for points 1, 5, and 8 respectively. For point 1 (FIG. 31a), a significant change is the reduction in entropy generation rate due to the suction side separation vortex, labelled A' in FIGS. 31a to 31c. Compared with the baseline in FIG. 27a, the losses associated with this vortex has almost completely been erased. However, there is still significant entropy generation due to the pressure side separation vortex, as can be seen in label C', although injection has reduced the entropy generation rate associated with the pressure side separation vortex. This is evident in the lack of high entropy generation found in regions C1 and C2 in FIG. 27a. Looking at the blade tip, injection seems to have increased the high-loss area related to tip leakage flow, evident by the larger area of D'. On the pressure surface, it is also evident that the high entropy generation regions associated with the pressure side separation vortex has been reduced and moved towards the hub by the injected fluid. This is shown as regions C1' and C2' in FIG. 30.

For point 5 (FIG. 31b), the entropy generation contours show that with injection, the high entropy region D' is compressed towards the blade suction surface and elongated towards the hub. Also, the entropy generation due to the suction side separation vortex is reduced slightly as indicated by A', showing that the injection is effective in reducing losses arising from the separation vortex. In addition, closer to the trailing edge of the blade, an additional region of high entropy generation was formed, shown as region E'. This region coincides with the separation of the leakage flow streamlines to form two counter-rotating vortex pairs, shown in FIG. 32b. This shows that near the blade tip, injection is detrimental to turbine efficiency, even though turbine work might be improved through better loading.

For point 8 (FIG. 31c), injection also reduces the entropy generation from the suction surface separation vortex slightly, as indicated by A'. Near the shroud, the high entropy generation region associated with the tip leakage flow D' has been reduced near the trailing edge. Compared to region D in FIG. 27c as shown herein, where there is a thin region of high entropy generation near the shroud across the entire blade passage close to the trailing edge, region D' in FIG. 31c shows a significantly reduced high entropy generation area which is confined near the suction surface. This shows that injection is effective in reducing the losses from tip leakage, though the authors are unclear of the exact mechanism on how this happens at this point of time. At point 8 (FIG. 31c), injection also causes the tip leakage flow to separate into a vortex pair, which causes additional losses as indicated by region E'. However, this effect is relatively weak compared to the one in point 5 (FIG. 31b).

From the numerical study described above on the effects of secondary flow injection through a circumferential slot on the shroud, the main findings are:
- the injected secondary flow is able to increase efficiency throughout all operating points tested
- the onset of tip leakage flow moves upstream as the turbine moves towards higher mass flow operation
- at low passage mass flow rate, negative incidence creates a separation vortex on the pressure surface
- detailed flow analyses show that injection creates a partial blockage that forces flow to follow the streamwise direction, and through this is able to weaken the suction side separation vortex, however this effect is reduced at higher turbine mass flow, likely due to the same injected flow having a smaller impact on a higher momentum passage flow
- at higher passage mass flows, injection causes the tip leakage vortex to separate into a counter-rotating vortex pair. this vortex pair is responsible for high entropy generation The above described turbine housing 100 and method 200 when applied to a turbocharger for an internal combustion engine employ smart diversification and channeling of the existing flow in the turbocharger turbine, instead of any modifications in the core geometry itself, so as to create a secondary flow injection to improve performance and/or work output. Not all the flow that goes into a turbine contributes to this purpose. Thus, the above described turbine housing 100 and method 200 utilize this available internal flow resource, and channel it for purpose meant to reduce the traditional losses in a turbocharger turbine. A secondary flow is injected through the modified housing that changes the flow characteristics of the flow passage and improves the performance, due to better blade loading characteristics. Where the introduction of secondary flow does not interfere with the main passage flow, only machine flow properties near the vicinity of the secondary flow are influenced but sufficiently to create improvements in both power output and efficiency. Where the introduction of secondary flow interferes with the main passage flow, it is able to help reduce losses arising from flow separation vortices within the main passage, improving turbine efficiency.

The experimentally validated computation analysis indicates a clear advantage of turbochargers integrated with this invention over the baseline. It is observed that in the turbine power output can be improved substantially using the injected flow, which can lead to a reduction in fuel consumption on an internal combustion engine. At optimized injection rates and flow angles, the overall turbine efficiency can be improved as well. A positive feature of the proposed novel approach is that it utilizes the existing exhaust gas to create the desired effect, with minimal external input. Thus the invention is achieved with minimal changes on the stator of the current turbocharger.

One of the main advantages is that no modifications in the blade geometry is required, with non-interference to main flow pattern and better turbine efficiency. Furthermore, the competitive advantage of the turbine housing is that it requires minimal changes to the existing turbocharger in general. Potential customers would not have to replace a whole new turbocharger. The requirement is to change only the turbine housing while the rest of the existing turbocharger can be kept the same. In that case, development and production cost is at a minimum as the cost of modifying the turbine housing to incorporate the current invention will be comparable to the current status-quo, when mass produced. It will involve a one-time preparation of the mould, and multiple castings can bring down the cost through economy of scale. The performance of turbochargers currently in the market can be improved by integrating the presently disclosed turbine housing without requiring a whole unit replacement. Since minimal changes are required to achieve the desired target as modification is necessary only in the turbocharger turbine housing, the turbocharger does not need to be re-matched to the engine. This by itself is a massive saving in terms of cost and man-hours. One of the most tedious and potentially critical exercises in turbocharging an engine is to match between the machines. This decides the net benefits which the engine can produce. For engines currently on the market that are already operating in their respective field and adequately matched with appropriate turbochargers, then application of the presently disclosed turbine housing and method will only improve engine power and fuel saving without jeopardizing matching between engine and turbocharger.

Notably, since using the turbine housing and method does not necessarily involve modification of the blade geometry of the machine, such independence from the turbine blade geometry thus makes the turbine housing and method viable for application in any commercially designed turbines.

Whilst there has been described in the foregoing description exemplary embodiments of the present invention, it will be understood by those skilled in the technology concerned that many variations in details of design, construction and/or operation may be made without departing from the present invention. For example, while the at least one injection opening has been described above as comprising a circumferential slot extending over at least part of the shroud it should be noted that the injection opening can be continuous over the circumference of the shroud (i.e. annular ring type) or segmented over the circumference of the shroud (i.e. discrete holes). More than one location of injection may be provided simultaneously. Shape of the injection opening may be rectangular, circular or any other shape that obtains improvement in turbine performance.

REFERENCES

BEHR, T., KALFAS, A. I. & ABHARI, R. S. 2008. Control of rotor tip leakage through cooling injection from the casing in a high-work turbine. *Journal of Turbomachinery*, 130, 031014.

BENTON, S. I., BONS, J. P. & SONDERGAARD, R. 2013. Secondary Flow Loss Reduction Through Blowing for a High-Lift Front-Loaded Low Pressure Turbine Cascade. *Journal of Turbomachinery*, 135, 021020.

BLOXHAM, M. J. & BONS, J. P. 2010. Leading-Edge Endwall Suction and Midspan Blowing to Reduce Turbomachinery Losses. *Journal of Propulsion and Power*, 26, 1268-1275.

DENTON, J. D. 1993. The 1993 igti scholar lecture: Loss mechanisms in turbomachines. *Journal of Turbomachinery*, 115, 621-656.

GAO, J., ZHENG, Q., DONG, P. & ZHA, X. 2014. Control of Tip Leakage Vortex Breakdown by Tip Injection in Unshrouded Turbines. *Journal of Propulsion and Power*, 30, 1510-1519.

HERWIG, H. & KOCK., F. 2007. Direct and indirect methods of calculating entropy generation rates in turbulent convective heat transfer problems. *Heat and mass transfer* 43, 207-215.

KIRTLEY, K. R., BEACH, T. A. & ROGO, C. 1993. Aeroloads and secondary flows in a transonic mixed-flow turbine stage. *Journal of turbomachinery*, 115, 590-600.

LIU, H., ROMAGNOLI, A., MARTINEZ-BOTAS, R., RAJOO, S. & PADZILLAH, M. H. Multi-Injection Turbine Housing: A Novel Concept for Tip-Leakage Improvement in Radial Turbines. ASME Turbo Expo 2017: Turbomachinery Technical Conference and Exposition, 2017 Charlotte, N.C., USA. American Society of Mechanical Engineers, V02CT44A022-V02CT44A022.

LÜDDECKE, B., FILSINGER, D. & EHRHARD, J. 2012. On Mixed Flow Turbines for Automotive Turbocharger Applications. *International Journal of rotating machinery*.

NEWTON, P., PALENSCHAT, T., MARTINEZ-BOTAS, R. & SEILER, M. Entropy generation rate in a mixed flow turbine passage. International Gas Turbine Congress 2015, 2015 Tokyo, Japan.

NIU, M. & ZANG, S. 2011. Experimental and numerical investigations of tip injection on tip clearance flow in an axial turbine cascade. *Experimental Thermal and Fluid Science* 35, 1214-1222.

PADZILLAH, M. H., RAJOO, S. & MARTINEZ-BOTAS, R. F. 2014. Influence of speed and frequency towards the automotive turbocharger turbine performance under pulsating flow conditions. *Energy Conversion and Management*, 80.

PALFREYMAN, D. & MARTINEZ-BOTAS., R. F. Numerical study of the internal flow field characteristics in mixed flow turbines. Proceedings of the ASME Turbo Expo, Jun. 3-6 2002 Amsterdam.

PRAISNER, T. J., GROVER, E. A., KNEZEVICI, D. C., POPOVIC, I., SJOLANDER, S. A., CLARK, J. P. & SONDERGAARD, R. 2013. Toward the Expansion of Low-Pressure-Turbine Airfoil Design Space. *Journal of Turbomachinery*, 135, 061007.

ROSIC, B. & DENTON, J. D. 2008. Control of shroud leakage loss by reducing circumferential mixing. *Journal of Turbomachinery*, 130, 021010.

SCHABOWSKI, Z. & HODSON, H. 2014. The reduction of over tip leakage loss in unshrouded axial turbines using winglets and squealers. *Journal of Turbomachinery*, 136, 041001.

WHITFIELD, A. & BAINES, N. C. 1990. *Design of Radial Turbomachines*, Longman Scientific & Technical.

YAMAMOTO, A. 1989. Endwall flow/loss mechanisms in a linear turbine cascade with blade tip clearance. *Journal of Turbomachinery*, 111, 264-275.

The invention claimed is:

1. A turbine housing for a radial/mixed flow turbine, the turbine having a rotor comprising a plurality of blades disposed about a hub, the turbine housing comprising:
a shroud configured to at least partially enshroud the rotor wherein a clearance is provided between the shroud and blade tips of the plurality of blades, the shroud and the hub defining a main passage of fluid flow in the turbine;
at least one injection opening provided in the shroud, the at least one injection opening configured to allow injection of a secondary flow of fluid into at least the clearance between the shroud and the blade tips; and
at least one exit opening provided in the shroud, the at least one exit opening being displaced from and downstream of the at least one injection opening,
wherein an inner wall of the shroud between the at least one injection opening and the at least one exit opening is recessed to provide an increased clearance between the shroud and the blade tips in between the at least one injection opening and the at least one exit opening.

2. The turbine housing of claim 1, wherein the at least one injection opening comprises a plurality of holes provided in the shroud.

3. The turbine housing of claim 1, wherein the at least one injection opening comprises at least one injection slot extending circumferentially around at least part of the shroud.

4. The turbine housing of claim 1, wherein the at least one injection opening is configured to allow injection of the secondary flow of fluid into only the increased clearance between the shroud and the blade tips, and wherein the at least one exit opening is configured to allow exit of the secondary flow of fluid from the increased clearance out of the shroud.

5. The turbine housing of claim 1, wherein the at least one injection opening is further configured to allow injection of the secondary flow of fluid into the main passage of fluid flow.

6. The turbine housing of claim 1, wherein the radial/mixed flow turbine is comprised in a turbocharger and wherein the secondary flow of fluid comprises at least one of: high pressure exhaust gas obtained from an internal combustion engine with which the turbocharger is coupled, air obtained from a compressor of the turbocharger, ambient air, and exhaust gas from the radial/mixed flow turbine.

7. A method of improving efficiency of a radial/mixed flow turbine, the turbine having a rotor comprising a plurality of blades disposed about a hub, the turbine housing comprising a shroud configured to at least partially enshroud the rotor wherein a clearance is provided between the shroud and blade tips of the plurality of blades, the shroud and the hub defining a main passage of fluid flow in the turbine, the method comprising the steps of:
   a) injecting a secondary flow of fluid into the clearance between the shroud and the blade tips through at least one injection opening provided in the shroud; and
   b) exiting the secondary flow of fluid from the clearance out of the shroud through at least one exit opening provided in the shroud, the at least one exit opening being displaced from and downstream of the at least one injection opening,
   wherein the clearance is an increased clearance by an inner wall of the shroud being recessed between the at least one injection opening and the at least one exit opening.

8. The method of claim 7, wherein step a) comprises injecting the secondary flow of fluid at a yaw angle relative to a rotational axis of the rotor, the yaw angle being on a θ-z plane at the at least one injection opening.

9. The method of claim 8 wherein the yaw angle is in a same direction from the rotational axis as a direction of rotation of the rotor.

10. The method of claim 7, further comprising the step of:
   c) injecting the secondary flow of fluid into the main passage of fluid flow.

11. The method of claim 10, wherein step c) comprises injecting the secondary flow of fluid at a pitch angle relative to a rotational axis of the rotor, the pitch angle being a radial angle made between the injected secondary flow of fluid and a horizontal plane.

12. The method of claim 7, wherein the radial/mixed flow turbine is comprised in a turbocharger and wherein the secondary flow of fluid comprises high pressure exhaust gas obtained from an internal combustion engine into which high density air from the turbocharger is fed.

13. The method of claim 12, wherein step a) comprises injecting the secondary flow of fluid in pulses.

14. The method of claim 7, wherein step a) comprises injecting the secondary flow of fluid in pulses.

15. A method of improving efficiency of a radial/mixed flow turbine, the turbine having a rotor comprising a plurality of blades disposed about a hub, the turbine housing comprising a shroud configured to at least partially enshroud the rotor wherein a clearance is provided between the shroud and blade tips of the plurality of blades, the shroud and the hub defining a main passage of fluid flow in the turbine, the method comprising the step of:
   a) injecting a secondary flow of fluid in pulses into the clearance between the shroud and the blade tips through at least one injection opening provided in the shroud.

16. The turbine housing of claim 1, further comprising a mesh interface provided between the increased clearance and the main passage.

* * * * *